United States Patent
Aggarwal et al.

(10) Patent No.: US 9,599,533 B2
(45) Date of Patent: Mar. 21, 2017

(54) ACCESSORY TO CONFIGURE PORTABLE DEVICE WITH CAMERA (E.G. SMARTPHONE) AS LIGHTING METER

(71) Applicant: ABL IP HOLDING LLC, Conyers, GA (US)

(72) Inventors: Januk Aggarwal, Tysons Corner, VA (US); Jack C. Rains, Jr., Herndon, VA (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 14/284,870

(22) Filed: May 22, 2014

(65) Prior Publication Data

US 2015/0338307 A1 Nov. 26, 2015

(51) Int. Cl.
*G01J 3/00* (2006.01)
*G01M 11/00* (2006.01)
*G01J 3/50* (2006.01)
*H04N 5/225* (2006.01)
*G03B 17/56* (2006.01)

(52) U.S. Cl.
CPC ............ *G01M 11/00* (2013.01); *G01J 3/505* (2013.01); *H04N 5/2254* (2013.01); *G03B 17/565* (2013.01)

(58) Field of Classification Search
CPC ...... G01N 21/251; G01J 3/505; G01J 3/0291; G01J 3/0256; G01J 3/46; G01J 2001/4252
See application file for complete search history.

(56) References Cited

U.S. PATENT DOCUMENTS

| | | | | |
|---|---|---|---|---|
| 5,272,518 | A * | 12/1993 | Vincent | 356/405 |
| 6,862,092 | B1 * | 3/2005 | Ibsen et al. | 356/328 |
| 7,420,663 | B2 * | 9/2008 | Wang et al. | 356/72 |
| 7,663,739 | B2 * | 2/2010 | Dirk | G01J 3/12 356/303 |
| 7,862,082 | B2 * | 1/2011 | Thomas | 280/740 |
| 2009/0278457 | A1 * | 11/2009 | Fischer | H01J 61/827 313/640 |
| 2011/0205240 | A1 * | 8/2011 | Marks | G06F 3/14 345/589 |
| 2012/0197599 | A1 * | 8/2012 | Seibel, II | G01J 1/10 702/189 |
| 2012/0250021 | A1 * | 10/2012 | Cheng | G01J 3/51 356/417 |
| 2013/0182250 | A1 * | 7/2013 | McClure | 356/302 |
| 2013/0250300 | A1 * | 9/2013 | Hung | G01N 21/25 356/402 |

OTHER PUBLICATIONS

"Spectrometer", Public lab, Apr. 29, 2013 (pp. 1-12) http://publiclab.org/wiki/spectrometer.*

(Continued)

*Primary Examiner* — Kara E Geisel
*Assistant Examiner* — Maurice Smith
(74) *Attorney, Agent, or Firm* — RatnerPrestia

(57) ABSTRACT

An example of an optical accessory configured to produce an optical image depicting spectral characteristics of light. The produced optical image is captured by an image capture sensor of a mobile device. The captured image is processed by the mobile device to produce a measured value corresponding to a lighting-related parameter.

16 Claims, 18 Drawing Sheets

(56) References Cited

OTHER PUBLICATIONS

"Smartphone spectrometer", Public lab, Sep. 28, 2013 (pp. 1-12), http://publiclab.org/wiki/smartphone-spectrometer).*
"Spectral Workbench usage", Public lab,Spectral Workbench usage (pp. 1-9), http://publiclab.org/wiki/spectral-workbench-usage.*
"Smartphone Spectrometer Kit", The Public Lab Store, Jan. 20, 2014 (http://store.publiclab.org/products/smartphone-spectrometer).
"Foldable Mini-Spectrometer", The Public Lab Store, Jan. 20, 2014 (http://store.publiclab.org/products/foldable-mini-spectrometer).
"Physics Buzz: Turn Your Phone Into a Spectrometer", Physics central physics buzz blog, Feb. 4, 2013, (http://physicsbuzz.physicscentral.com/2013/02/turn-your-phone-into-spectrometer-for.html).

* cited by examiner

ACCESSORY TO CONFIGURE PORTABLE DEVICE WITH CAMERA (E.G. SMARTPHONE) AS LIGHTING METER

TECHNICAL FIELD

The present subject matter relates to techniques and equipment to support lighting design specialists identify and quantify performance of new and existing lighting systems within a space. Such support is based on measuring current lighting conditions and reporting at least one corresponding lighting-related parameter.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use. Lighting design, however, can be very complex and require specialized expertise along with highly customized tools.

Lighting solutions, particularly in commercial and/or high-end residential spaces, are typically designed by representatives of lighting manufacturers. Such lighting professionals design lighting solutions to meet the needs of current or would-be occupants of the space, but with a particular lighting manufacturer's product in mind. As such, the current or would-be occupant might have multiple alternative solutions from which to select. Furthermore, lighting installers and/or service technicians are often tasked with ensuring complex lighting solutions are properly installed and functioning optimally.

However, identifying and quantifying the performance of lighting sources has remained difficult and often requires expensive specialized equipment that is not easily movable and/or readily available. Efforts have been made to provide simple cheap alternatives, but the results are often inconsistent and/or inaccurate.

SUMMARY

What is needed, therefore, is a cost-efficient, portable solution that is highly accurate and consistent. The techniques and equipment discussed below leverage the processing power of existing mobile devices to provide more accurate and consistent measurements of current lighting conditions as a cost-efficient, portable solution.

A system example described in detail below includes an optical accessory configured to produce an optical image depicting spectral characteristics of light entering the optical accessory and a program for execution by a processor of a mobile device. In that example, execution of the program by the mobile device processor configures the system to control an image capture sensor of the mobile device to capture the optical image produced by the optical accessory, and process the captured optical image to produce at least one lighting-related parameter based on at least one measured value corresponding to the captured optical image. The mobile device may output the produced at least one measured value and the corresponding at least one lighting-related parameter.

The system example may implement one or more of a spectrometer, a spectroradiometer (e.g., radiometer and/or photometer), a paint spectrum analyzer, and a flicker meter.

An example of a non-transitory machine-readable storage medium described in detail below includes executable instructions stored therein executable by a processor of a mobile device. In the non-transitory machine-readable storage medium example, execution of the instructions by the processor configures the mobile device to control an image capture sensor of the mobile device to capture an optical image, and process the captured optical image to produce at least one lighting-related parameter based on at least one measured value corresponding to the captured optical image. The mobile device may output the produced at least one measured value and the corresponding at least one lighting related parameter.

An example of a method described in detail below includes the steps of producing, by an optical accessory proximate an image capture sensor of a mobile device, an optical image depicting spectral characteristics of light entering the optical accessory, capturing, by the image capture sensor of the mobile device, the produced optical image, and processing, by the mobile device, the captured optical image. The example method further includes the steps of producing, by the mobile device, at least one measured value corresponding to at least one lighting-related parameter and outputting, via the mobile device, the produced at least one measured value and the corresponding at least one lighting-related parameter.

An example of an optical accessory described in greater detail below includes an elongated light box configured to be removably attached to a mobile device proximate an image capture sensor of the mobile device, a diffraction grating located near the proximal end of the elongated light box, and a slit located in or near the distal end of the elongated light box. In the optical accessory example, the optical accessory produces an optical image depicting spectral characteristics of light entering the optical accessory via the slit and passing through the diffraction grating, the optical image for capture by the image capture sensor of the mobile device.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
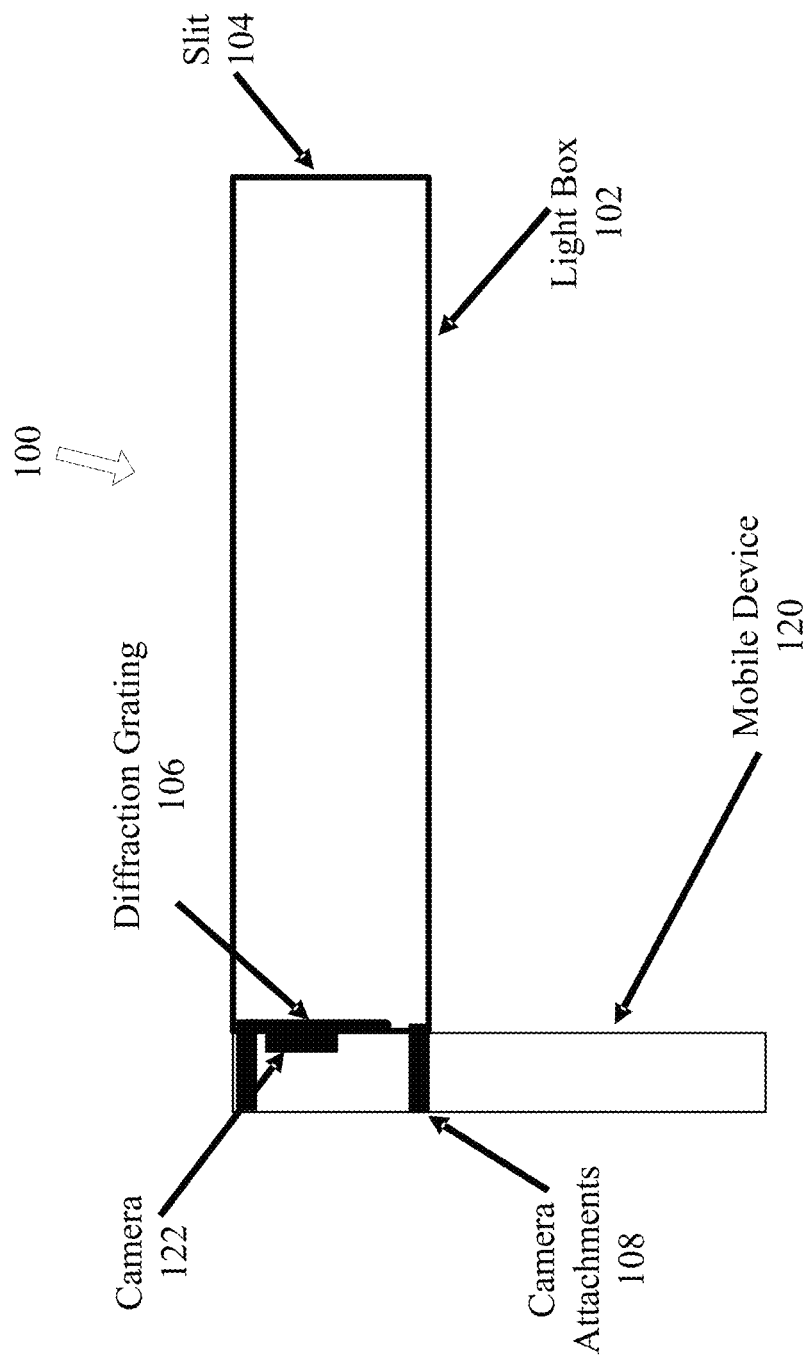
FIG. 1 is a block diagram of an example of an optical accessory attached to a mobile device and configured to produce an optical image depicting spectral characteristics of light, with a wall of the accessory cut away to show some elements with the accessory.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Lighting is commonplace and an everyday occurrence. Lighting design, however, is complex and highly technical, particularly in a commercial setting such as an office building, warehouse, or other similar space. A typical user of lighting in a commercial setting, for the most part, is only concerned with whether the lighting works and provides sufficient light for the task at hand. The typical user, however, is not necessarily concerned with how the lighting system was designed and/or whether the lighting is performing at an optimal level. On the other hand, lighting design and optimization is the key role of a lighting professional, such as a lighting designer, service technician, installer, other type of manufacturer representative, etc.

Proper design and optimization of lighting involves complex and highly technical calculations that historically have required highly specialized equipment. Such equipment is typically expensive and/or not highly portable. For example, a lighting professional or the like has traditionally been unable to make cost effective assessments of existing lighting to determine optimal performance. With the advent of mobile devices with advanced computing resources, such as smartphones, smartwatches and/or smart digital cameras, the necessary processing power to make such assessments has been made more readily available. A lighting professional, however, still needs a means to capture a light sample for subsequent processing by the mobile device as well as the particular programming to control the mobile device, process the light sample and produce the expected results.

An optical accessory that captures a light sample from a light source and produces an optical image depicting spectral characteristics of the sample light is needed. Another need is for a process and/or a program for capturing the produced optical image by a mobile device, measuring various values corresponding to lighting-related parameters and reporting the measured values as well as the corresponding lighting-related parameters to the user of the mobile device and optical accessory.

Several of the examples improve the ability of a user to measure and quantify the performance of lighting sources, the various examples of an optical accessory and processing of an optical image depicting spectral characteristics of light provide at least one lighting-related parameter based on at least one measured value corresponding to the at least one lighting-related parameter. Other processing examples relate to flicker and/or brightness measurements.

Reference now is made in detail to the examples illustrated in the accompanying drawings and discussed below.

FIG. 1 illustrates an optical accessory 100 attached to a mobile device 120. The accessory produces an optical image depicting spectral characteristics of light for capture and processing by the mobile device. In one example, the optical accessory 100 consists of a light box 102 attached to the mobile device 120 via attachments 108. The light box 102 is, for example, an elongated, rectangular shape and fully encloses an area proximal an image capture sensor (e.g. camera) 122 of mobile device 120. The light box 102, in the example, includes a slit 104 at or near the distal end and a diffraction grating 106 at the proximal end (adjacent the optical input of the camera).

Light box 102 is constructed from, for example, a lightweight plastic or other solid opaque material that precludes light from entering the light box generally. Although the external color of light box 102 is not significant, the interior, for example, may be painted, textured, baffled and/or otherwise treated to appear black to reduce internal reflection that might otherwise disrupt optical imaging. In this way, the fully enclosed space is dark and generally void of any light except for that entering via the slit 104.

The slit 104 allows light to enter the otherwise dark light box 102. The light entering the light box 102 via slit 104 is, for example, directed towards the diffraction grating 106. The diffraction grating 106 is, for example, an optical component with a periodic structure (e.g., ridges, rulings, dark lines, etc.) which splits and diffracts the light entering the light box 102 via slit 104 as the light passes through the diffraction grating 106. Thus, the diffraction grating 106 acts as a dispersive element that results in several beams of light traveling in different directions based on their corresponding wavelengths. That is, a "rainbow" of colors, with each line or band representing a corresponding range of wavelengths, is generated. Lines represent relatively narrow ranges, whereas wider bands represent broader ranges. The generated "rainbow" of colors, or spectra, is an optical image that depicts the spectral characteristics of the light entering the light box 102 via slit 104 and passing through diffraction grating 106. In one example, diffraction grating 106 causes different light of different wavelengths to be directed to characteristic angles defined by the details of diffraction grating 106 (e.g., the pitch between the ridges, rulings, dark lines, etc.). Upon differentially redirecting the different wavelengths by diffraction grating 106, an angular signature is converted, for example, into a positional signature by camera 122. This optical image is then captured, for example, by the camera 122 of mobile device 120.

Once the generated optical image depicting spectral characteristics of the light entering the optical accessory 100 is captured by the camera 122, the captured image is processed, for example, by circuitry and/or programming of the mobile device 120. Mobile device 120 is, for example, a smartphone or tablet. In alternate examples, mobile device 120 may be a digital camera or other portable electronic device, such as an iPod, other digital music player, smartwatch, or a portable/handheld video game that includes one or more image capture devices, a processor and one or more interface elements, within a handheld or other type of relatively portable form factor. Although FIG. 1 depicts camera 122 as rear-facing, optical accessory 100 may be positioned such as to alternatively use a front-facing camera. In further alternate examples, mobile device 120 may be a smartphone, tablet or other electronic device capable of processing an optical image and a camera or other image capture sensor external to but otherwise connected and/or in communication with the smartphone, tablet or other electronic device for capturing the optical image. Thus, in FIG. 1 and various other figures, mobile device 120 is depicted as a single device incorporating camera 122 as an integral component. This is only for simplicity and no such requirement exists. Alternatively, as described below in relation to FIG. 1A, mobile device 120 is, for example, a smartphone, tablet or other electronic device connected to or otherwise in communication with camera 122.

In one example, the processing involves measuring one or more values corresponding to one or more lighting-related parameters. For example, the spectral power distribution of the light is measured and the radiometric, photometric, and/or colorimetric quantities of the light are determined. Specifically, characteristics such as illuminance, irradiance, luminance, radiance, light absorption, scattering of light, reflection of light, fluorescence, phosphorescence, and/or luminescence are determined based on the measured spectral power distribution of the light. Furthermore, based on the measured spectral power distribution, one or more lighting-related parameters are determined. The lighting-related parameters include, for example, one or more of correlated color temperature (CCT), delta UV (Duv), chromaticity, color rendering index (CRI), Ra (CRI represents 14 color swatches, i.e. R1-R14, and Ra represents the average of the first 8), color quality scale (CQS), gamut area index (GAI) and/or other metrics derived from spectral data. These characteristics and lighting-related parameters provide an identification and quantification of the performance of the light source generating the light entering the optical accessory 100.

In this way, a user, such as a lighting professional, may utilize the camera 122 of mobile device 120 to capture an optical image generated by the optical accessory 100 and easily identify and quantify, based on processing of the captured image by the mobile device 120, the performance of a particular lighting source. For example, a representative for a lighting manufacturer may utilize optical accessory 100 to capture light from an existing lighting installation as part of a demonstration of proposed new lighting from the lighting manufacturer. In this example, the representative attaches optical accessory 100 to mobile device 120 and directs the optical accessory at the existing light source. As described in greater detail below, the representative captures an optical image depicting spectral characteristics of the light source generated by optical accessory 100 using mobile device 120. Mobile device 120, in the example, then processes the optical image and produces corresponding lighting-related parameters (e.g., CCT, CRI, Ra, etc.). The representative may then use the produced lighting-related parameters as a reference point in the demonstration of the proposed new lighting. Further in this example, the representative may likewise capture an optical image depicting spectral characteristics of the proposed new lighting and, using mobile device 120, produce the corresponding lighting-related parameters of the proposed new lighting (e.g., CCT, CRI, Ra, etc.). In this way, the representative provides, for example, a comparison of the performance of the existing lighting and the proposed new lighting.

Figure 1A:
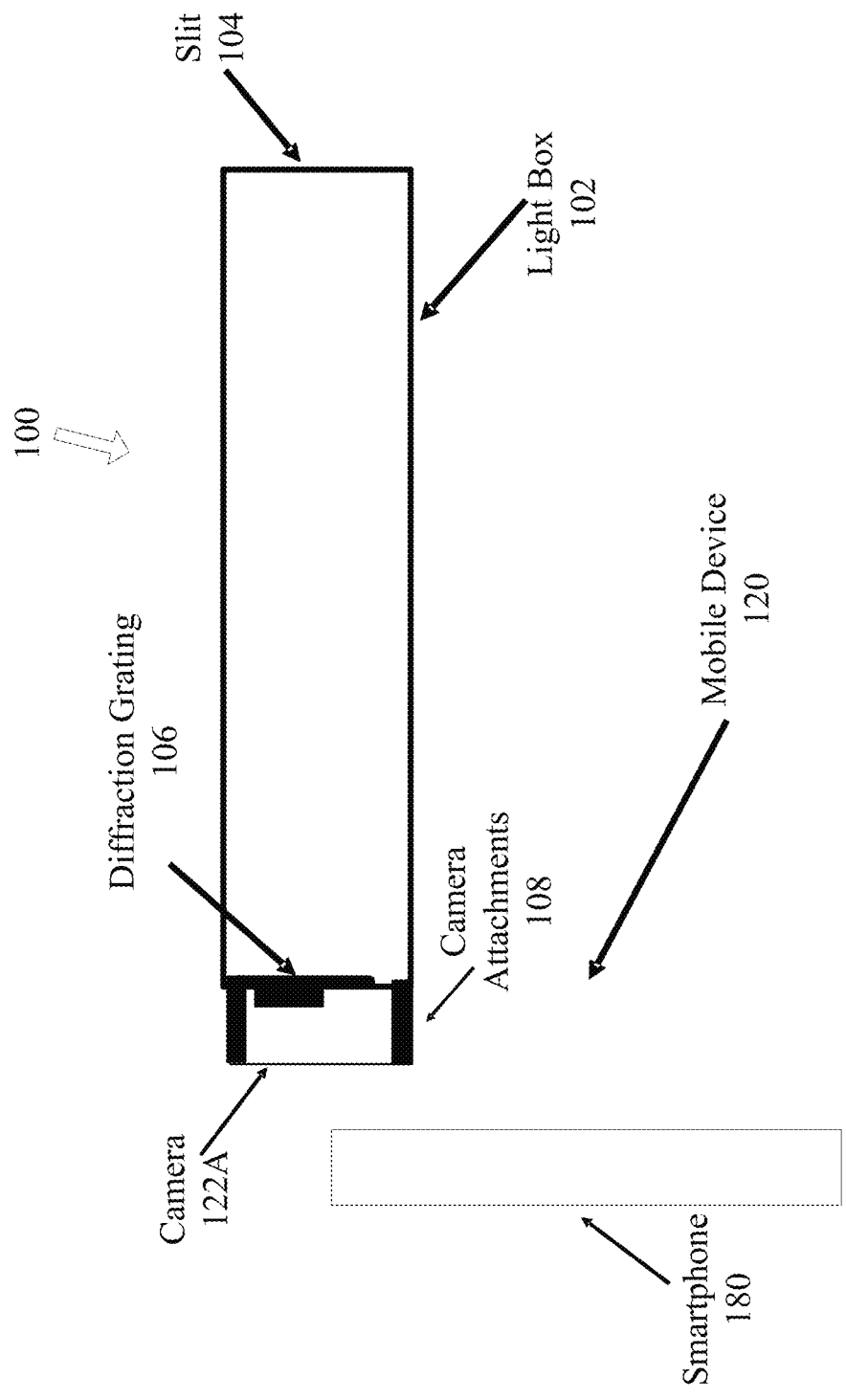
FIG. 1A is a block diagram of an example of an alternate mobile device configuration for use with an optical accessory, such as the optical accessory of FIG. 1.

FIG. 1A illustrates mobile device 120 depicted as a smartphone, tablet or other electronic device 180 connected or otherwise in communication with a camera 122A. Camera 122A is, for example, a digital camera capable of data communications, such as Wi-Fi or Bluetooth. In this example, camera 122A captures the optical image produced by optical accessory 100 and camera 122A transfers the captured optical image to smartphone 180 via an established channel of communication (e.g., Wi-Fi, Bluetooth, etc.). In an alternate example (not shown), a physical connection is established between camera 122A and smartphone 180 and the physical connection is utilized to transfer the captured optical image from camera 122A to smartphone 180. The physical connection is, for example, a USB cable or other appropriate cable.

Figure 2:
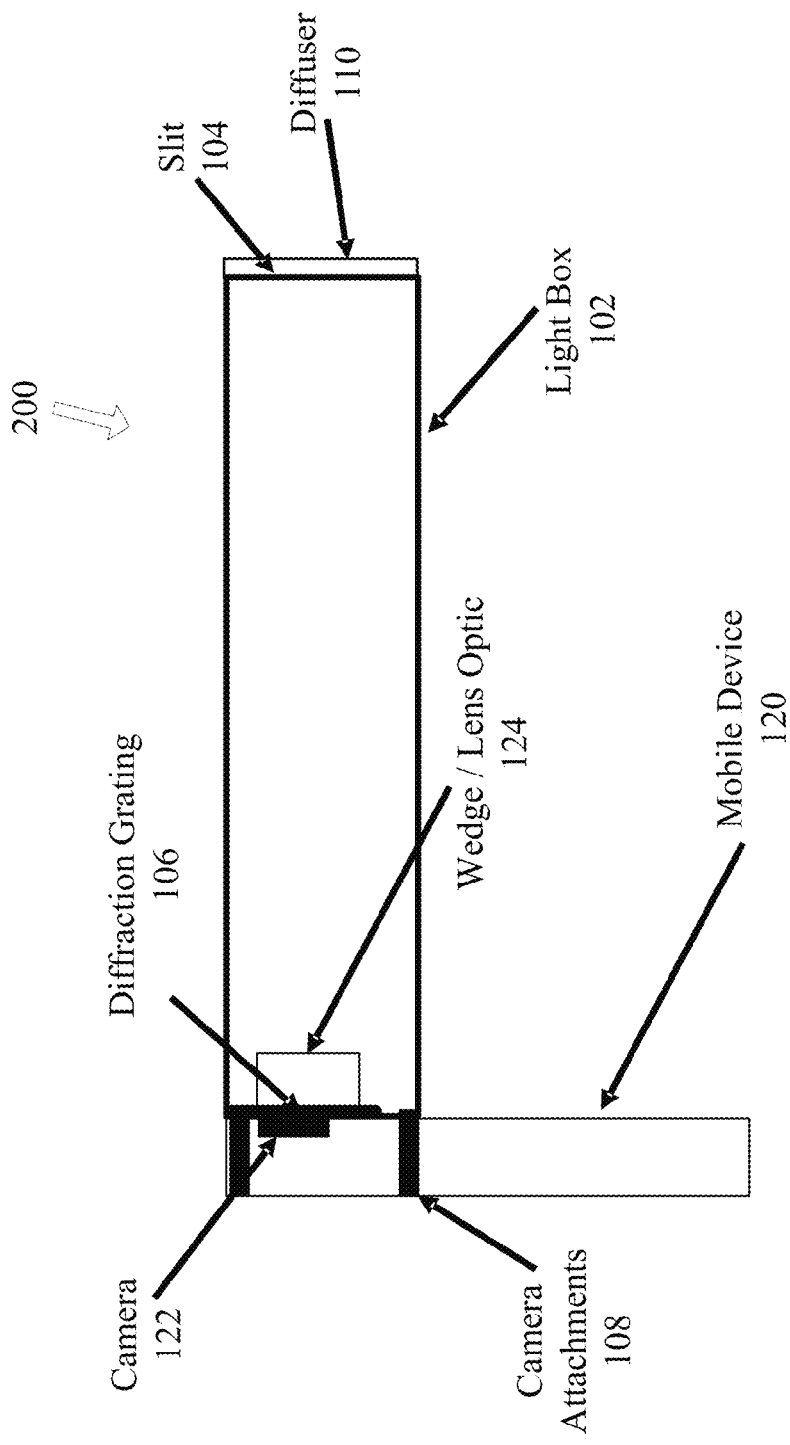
FIG. 2 is a partial cut-away diagram of an example of an optical accessory, such as the optical accessory of FIG. 1, including additional options.

FIG. 2 illustrates an optical accessory 200, similar to the optical accessory 100 of FIG. 1, as well as additional optional components. Like elements are represented with like reference numerals and will not be described again. In FIG. 2, light box 102 includes diffuser 110 attached externally to the distal end of light box 102 and covering the slit 104. Although diffuser 110 is shown attached externally, no such requirement exists and diffuser 110 could alternately be attached internally within light box 102. Light box 102 also includes a wedge and/or lens optic 124 attached to camera 122. Although FIG. 2 shows both diffuser 110 as well as wedge and/or lens optic 124, this is only for simplicity. Light box 102 may incorporate either and/or both diffuser 110 as well as wedge and/or lens optic 124.

Diffuser 110 is, for example, a white translucent object, such as ground glass, Teflon, opal glass, greyed glass and/or other translucent material (e.g., tissue paper). Diffuser 110 functions to diffuse and/or otherwise spread out or scatter the light entering the optical accessory 100. Diffuser 110 allows, for example, camera 122 to detect light from any direction that is falling on slit 104.

With diffuser 110, optical accessory 200 fundamentally allows light impinging from all directions and, therefore, from all sources that contribute light to a given area to be measured. Thus, optical accessory 200 with optional diffuser 110 allows lighting characteristics such as illuminance and irradiance to be measured. In an alternate example (not shown), diffuser 110 may be replaced or augmented by additional optical elements to limit the field of view to a narrow cone of incoming light (e.g., 2° or 10°). In this alternate example, optical accessory 200 with diffuser 100 replaced or augmented by additional optical elements allows the light from a specific direction and, therefore, a specific source to be measured. In this way, lighting characteristics such as luminance or radiance may be measured.

The wedge and/or lens optics 124 is, for example, a camera accessory, such as a wide angle lens, available from the manufacturer of mobile device 120, the manufacturer of the camera 122, a third-party accessory manufacturer, and/or as part of optical accessory 200. Wedge and/or lens optics 124 function to aid in capturing the proper field of view of the generated image. That is, wedge and/or lens optics 124 changes the direction of the field of view of camera 122 in order to better capture an entire spectra. Thus, FIG. 2 depicts optical accessory 200 with optional improvements to optical accessory 100.

Figure 3:
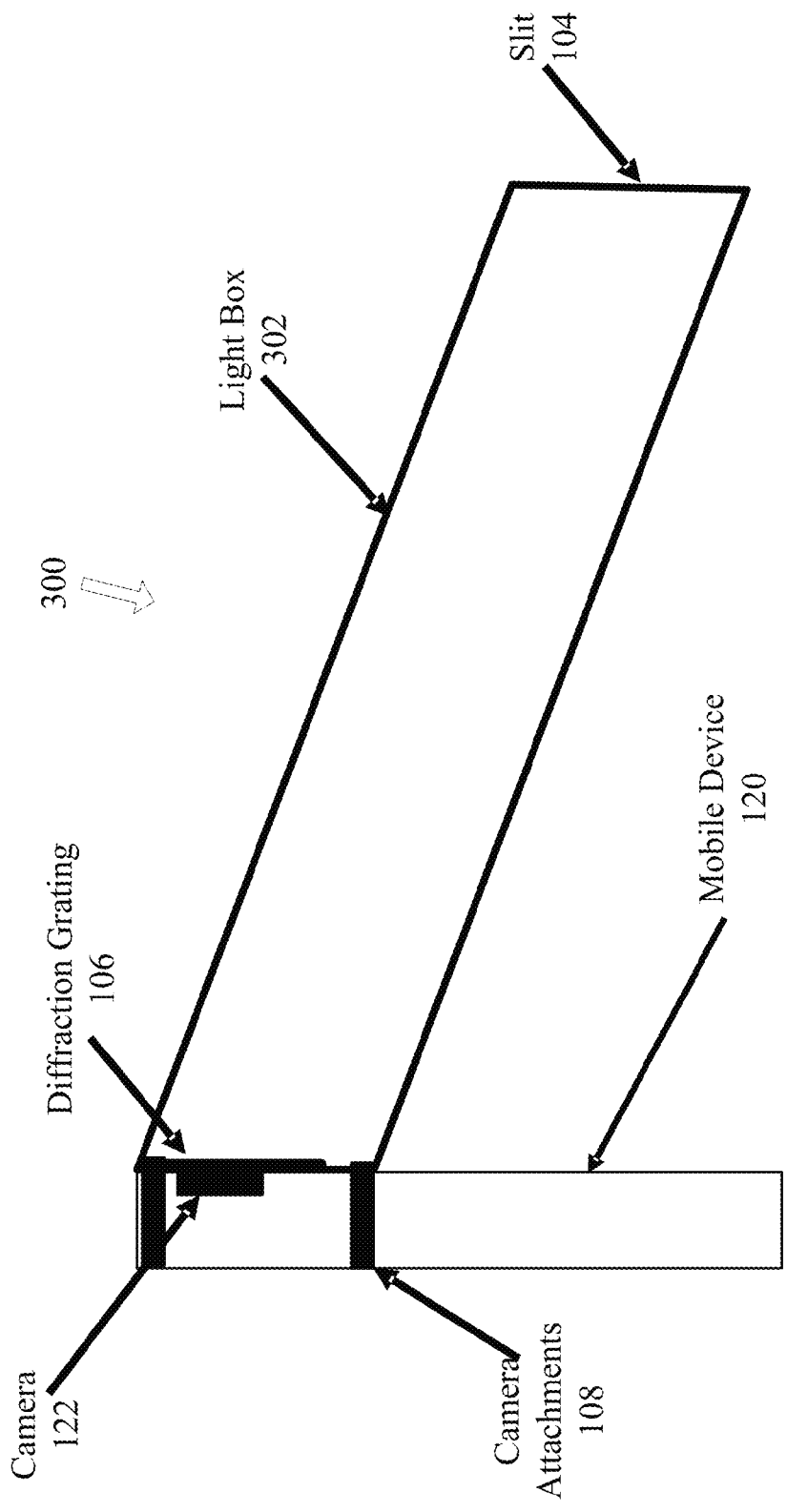
FIG. 3 is a partial cut-away diagram of an example of an optical accessory, such as the optical accessory of FIG. 1, using a different form.
Figure 4:
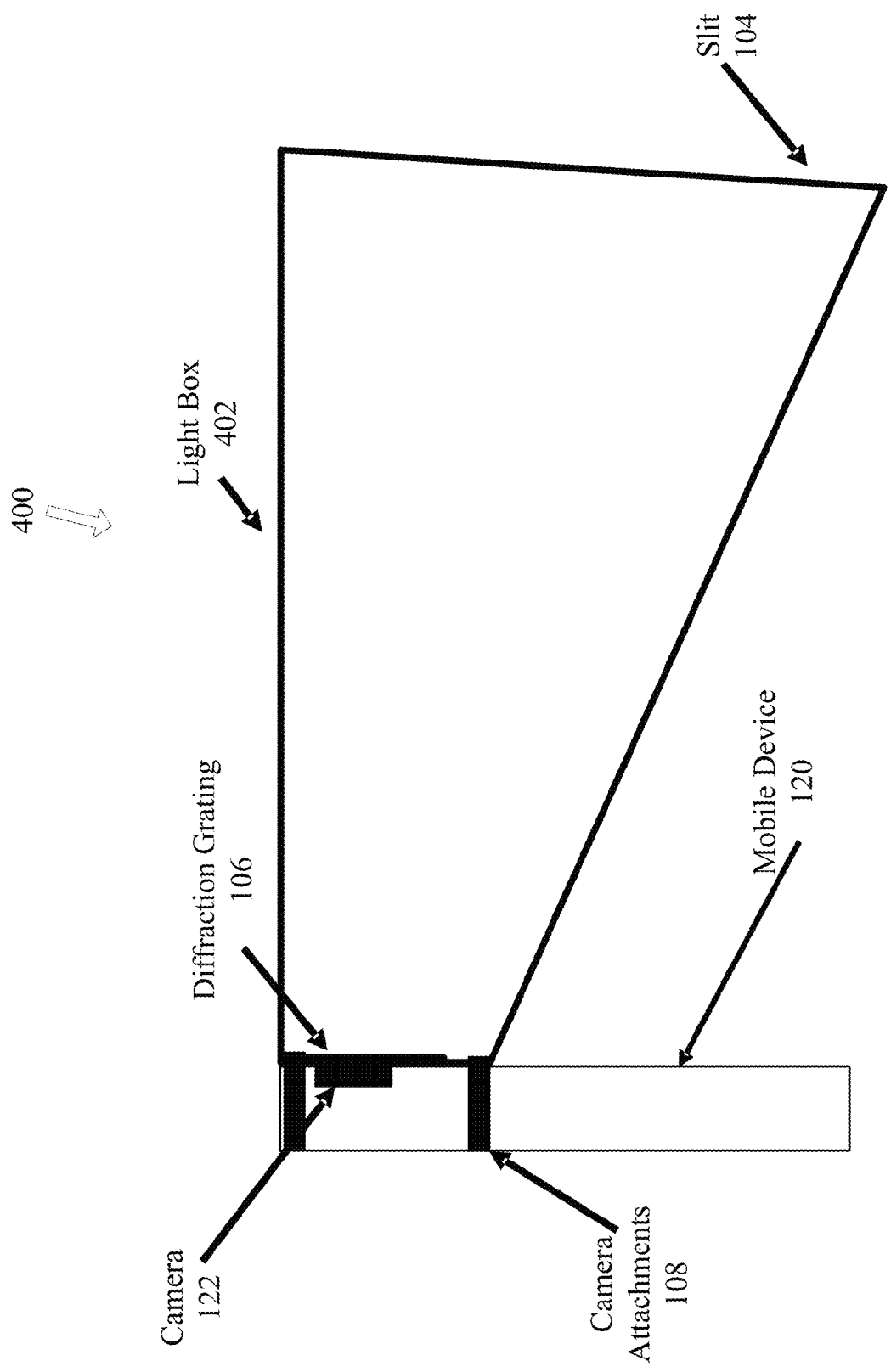
FIG. 4 is a partial cut-away diagram of an example of an optical accessory, such as the optical accessory of FIG. 1, using another different form.

FIG. 3 depicts an alternative optical accessory 300 with light box 302 shaped as an elongated parallelogram. FIG. 4 depicts an alternative optical accessory 400 with light box 402 shaped as an elongated wedge. The alternative shapes of light boxes 302 and 402 in FIGS. 3-4 result in various differences to the light entering the optical accessory 100 and the resulting image generated by the optical accessory 100. That is, the alternate parallelogram and wedge shapes of light boxes 302 and 402 serve the same function as the optional wedge and/or lens optics 124 of FIG. 2 to change the direction of the field of view of camera 122 in order to better capture an entire spectra. Furthermore, the alternate shapes of light boxes 302 and 402 help, for example, to minimize the impact of scattered light from the interior walls of the corresponding light box.

Figure 5:
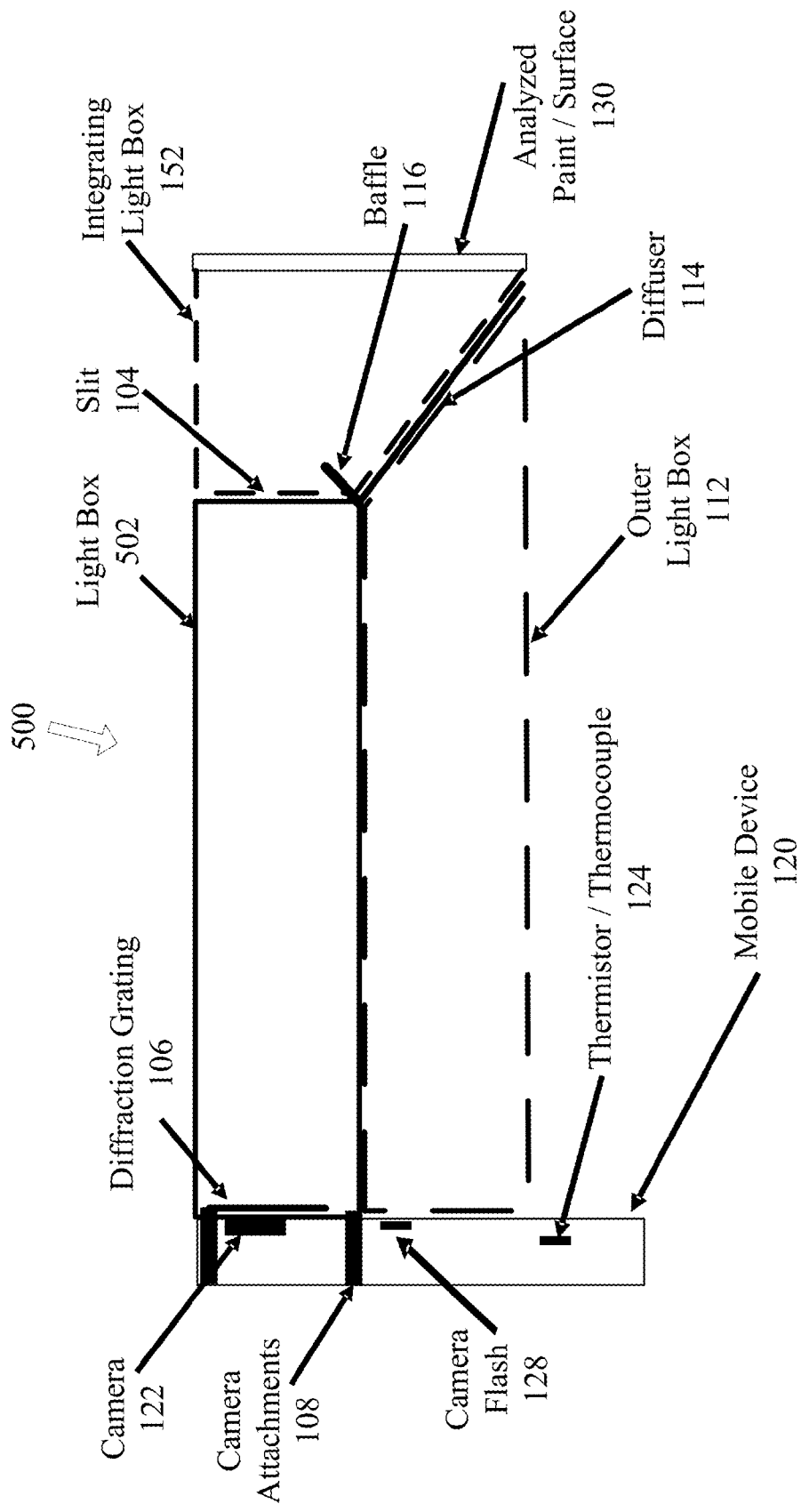
FIG. 5 is a partial cut-away diagram of an example of an optical accessory, including components of the optical accessory of FIG. 1 as well as additional components.

FIG. 5 illustrates an optical accessory 500 similar to optical accessory 100 of FIG. 1. Like elements are represented with like reference numerals and the corresponding description will not be provided again. In addition to light box 502, slit 104 and diffraction grating 106, optical accessory 500 includes an outer light box 112, an integrating light box 152, diffuser 114 and baffle 116. The outer light box 112 is, for example, an elongated rectangle with one side having a length equal to light box 502 and one side extending beyond the distal end of light box 502. While light box 502 is covered at the distal end with the exception of slit 104, the distal end of outer light box 112 is formed by diffuser 114 extending at an angle from the shorter side of outer light box 112 to the extended side of light box 112. When the distal end of outer light box 112 is placed proximate a paint sample and/or surface 130 to be analyzed, the extended side of outer light box 112 creates a space between the paint sample and/or surface 130 and the distal end of light box 502. Integrating light box 152 encloses this space and includes apertures appropriately placed to allow light to pass through diffuser 114, strike the paint sample and/or surface 130 and reflect back through slit 104. Integrating light box 152 also includes baffle 116 extending from where the shortened side of outer light box 112 and the distal end of light box 502 meet into the space enclosed by integrating light box 152.

As with light box 102 of FIG. 1, light box 502 is constructed from, for example, a lightweight plastic or other solid material that precludes light from entering the light box generally. Similarly, light box 112 is constructed from, for example, a lightweight plastic or other solid opaque material. In addition, while light box 102 is painted, textured, baffled and/or otherwise treated to appear black, the interior of light box 112 is painted and/or otherwise treated to appear white and/or with a phosphorescent material to enhance and/or correct the spectrum of light generated by a camera flash 128. The outer light box 112 is positioned adjacent to mobile device 120 in such a fashion that the proximal end of outer light box 112 covers the camera flash 128 of mobile device 120.

In one example, light box 502, outer light box 112 and integrating light box 152 are formed as a single integrated part with internal walls providing the required separation of the chambers. Alternatively, one or more of the light boxes are formed, for example, separately from the remaining light box(es). The separately formed light boxes are then assembled together to form optical accessory 500.

In an alternate example (not shown), outer light box 112 may be replaced by any light source with a suitably even illumination across the sample area of the surface to be analyzed as well as a suitable and known spectrum.

In a further example, one or more of light box 502, outer light box 112 and integrating light box 152 are filled with a solid or liquid material with suitable optical properties (e.g., clear glass, plastic, silicone, etc.). In this example, the solid or liquid materials forming the optical cavities of outer light box 112 and/or integrating light box 152 are polished and there is no other material of similar or higher refractive index in optical contact with any surface of optical accessory 500 such that light can reflect by total internal reflection as it propagates through the accessory 500.

Figure 5A:
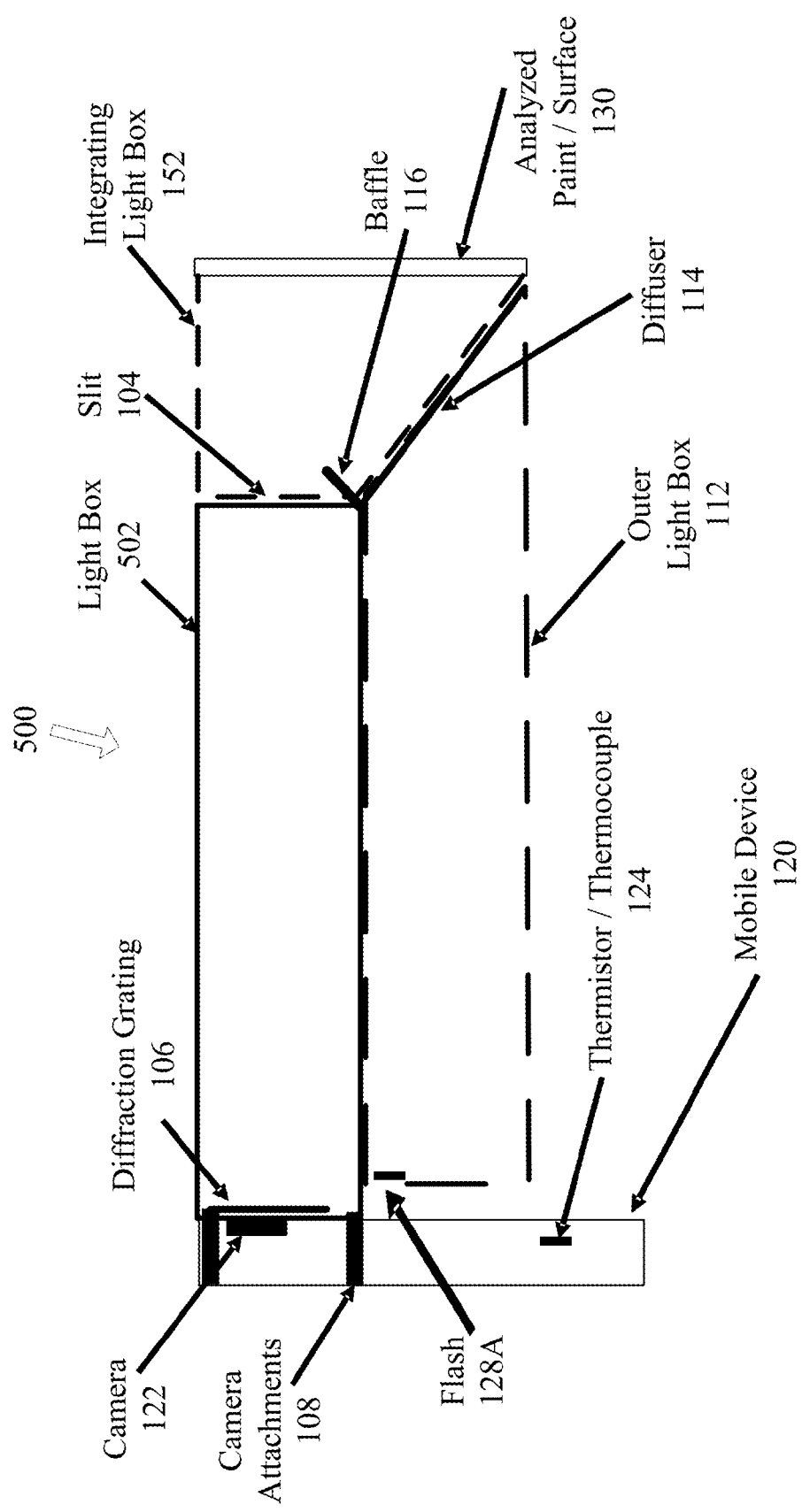
FIG. 5A is a block diagram of an example of an alternate mobile device configuration for use with an optical accessory, such as the optical accessory of FIG. 5.

Although FIG. 5 depicts flash 128 as integral to the smartphone, tablet or other electronic device component of mobile device 120, no such requirement exists and this is only for simplicity. Alternatively, as depicted in FIG. 5A, flash 128A is, for example, external and/or otherwise separate and distinct from the smartphone, tablet or other electronic device component of mobile device 120, much in the same way as camera 122A of FIG. 1A. As with camera 122A of FIG. 1A, flash 128A is located externally and connected or otherwise in communication with and controlled by mobile device 120. Such connection is, for example, physical (e.g., USB cable) or wireless (e.g., Wi-Fi, Bluetooth, etc.).

Returning to FIG. 5, diffuser 114, like diffuser 110, is, for example, a white translucent object, such as ground glass, Teflon, opal glass, greyed glass and/or other translucent material (e.g., tissue paper). The diffuser 114 extends from the lower distal end of light box 502 to the lower distal end of outer light box 112 and the baffle 116 extends from the lower distal end of light box 502 into the area beyond light box 502 and surrounded by integrating light box 152. Such configuration allows, for example, a reflectance quantity related to the paint sample and/or surface 130 to be measured. In addition, optical accessory 500 may be utilized similarly to any one of the optical accessories of FIGS. 1-4 to produce a lighting-related parameter, if not placed near paint sample and/or surface 130.

In one example, the camera flash 128 functions as a light source to generate light entering outer light box 112. The generated light from camera flash 128, in this example, passes through diffuser 114 and strikes the paint sample and/or surface 130 to be analyzed. The paint sample and/or surface 130 reflects the generated light back towards light box 502. This reflected light enters light box 502 via slit 104 and passes through diffraction grating 106 to produce an optical image depicting spectral characteristics, such as described above in relation to FIG. 1. That is, the optical image depicts the spectral characteristics of the light generated by camera flash 128 as reflected by paint sample and/or surface 130. The baffle 116 serves to deflect any of the generated light passing through diffuser 114 from directly entering slit 104. As such, in one example, baffle 116 is made from a lightweight plastic and/or other solid material and is painted and/or otherwise treated to appear black. In this way, only light reflected from the paint sample and/or surface 130 enters slit 104.

As described above in relation to FIG. 1, the produced optical image is processed, for example, to measure one or more values corresponding to one or more lighting-related parameters. For example, the spectral power distribution of the light is measured and the radiometric, photometric, and/or colorimetric quantities of light are determined. Specifically, characteristics such as illuminance, irradiance, light absorption, scattering of light, reflection of light, fluorescence, phosphorescence, and/or luminescence can be measured. One or more of these measured values, individually, collectively, and/or in some combination, correspond to one or more lighting-related parameters. The lighting-related parameters may include, for example, one or more of correlated color temperature (CCT), delta UV (DUV), chromaticity, color rendering index (CRI) and/or color rendering index-9 (R9). These lighting-related parameters provide an identification and quantification of how paint sample and/or surface 130 interacts with light.

FIG. 5 also illustrates a thermistor and/or thermocouple 124 as part of mobile device 120. Such thermistor and/or thermocouple 124 is used, for example, to manage the impact of the temperature of camera 122 and/or flash 128. In particular, thermistor and/or thermocouple 124 provides the temperature of camera flash 128 and camera 122 in order to better calibrate the performance of camera flash 128 and camera 122.

Figure 6:
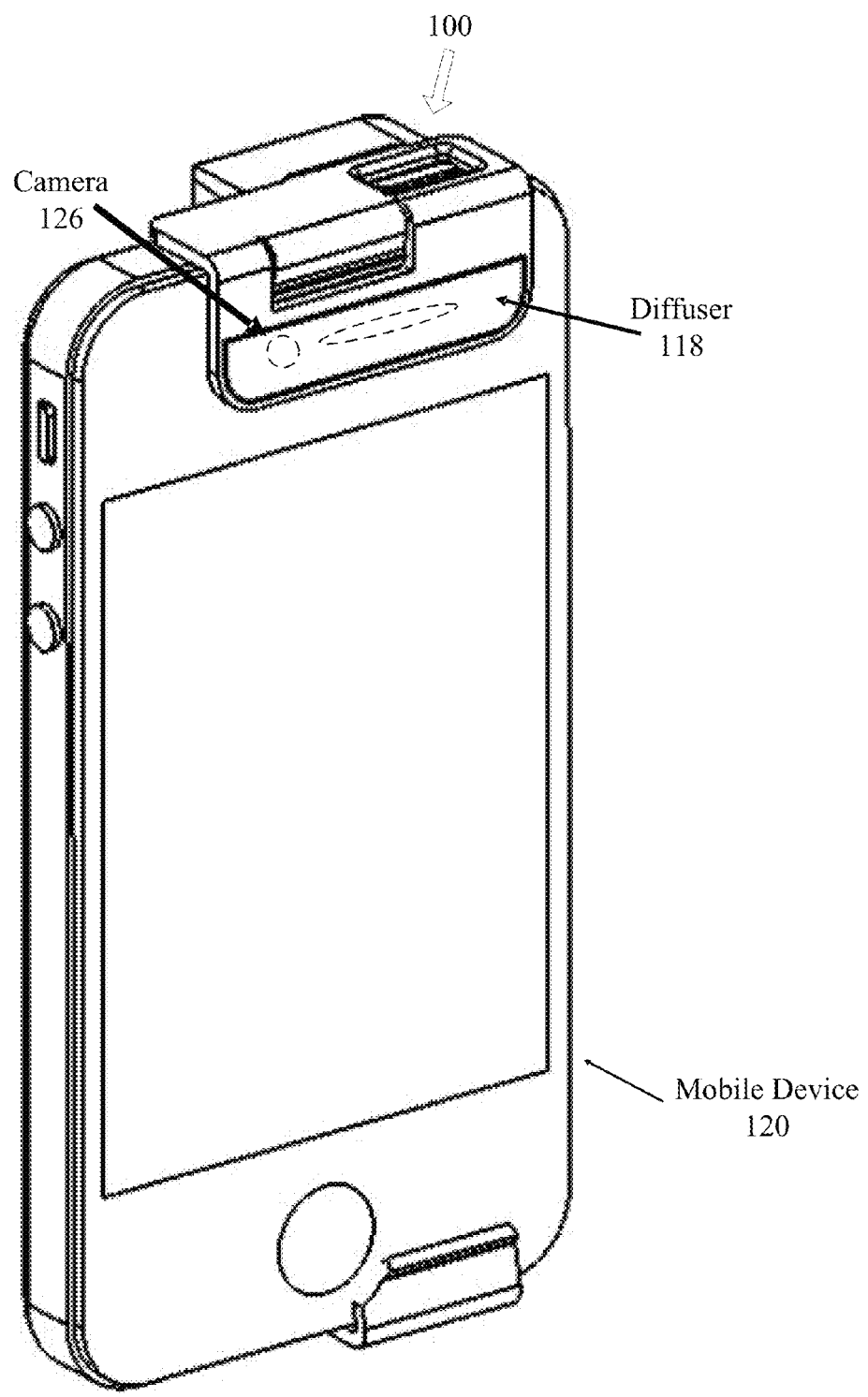
FIG. 6 is a view of an example of an optical accessory, such as the optical accessory of FIG. 1, from a different perspective and depicting an additional component.

FIG. 6 illustrates the mobile device 120 and optical accessory 100, as depicted in FIG. 1, from a different perspective. That is, FIG. 1 depicts optical accessory 100 with light box 102 extending from the rear of mobile device 120 while FIG. 6 depicts the front of mobile device 120. Optical accessory 100 includes, for example, diffuser 118 which is positioned in such a fashion as to cover an image capture sensor (i.e. camera) 126 of mobile device 120. Alternatively, diffuser 118 may be positioned in such a fashion as to cover camera 122 of mobile device 120. That is, optical accessory 100 includes light box 102 on one side and diffuser 118 on the other side with each side configured to be positioned over a corresponding camera 122, 126 of mobile device 120. Furthermore, which camera 122, 126 is utilized by which side (e.g., light box 102 and diffuser 118) of optical accessory 100 is not significant.

Diffuser 118, as with diffuser 110 and diffuser 114, is, for example, a white translucent object, such as ground glass, Teflon, opal glass, greyed glass and/or other translucent material (e.g., tissue paper). Unlike the optical image depicting spectral characteristics of light (e.g., "rainbow" of colors) produced by light box 102, the diffuser 118, in conjunction with the refresh rate of camera 122, produces an image that depicts the visible change in brightness of a light source due to rapid fluctuations, such as fluctuation in the voltage of the power supply. If multiple light sources contribute to the captured light, the produced image depicts fluctuations in the combined captured light. This change in brightness is referred to as flicker. Thus, the produced image depicts alternating bands of bright and dim light. Circuitry and/or programming in mobile device 120 analyzes, for example, the width of each band and the total number of bands, in conjunction with the refresh rate of camera 122, to determine, for example, the flicker rate associated with the light source. As a result, mobile device 120 can measure, in this example, the rate of cycles of intensity of the light passing through diffuser 118 between a local maxima and minima.

Diffuser 118 also allows, for example, mobile device 120 to determine, based on an image captured by camera 122, the intensity and/or brightness of a light source. In this way, diffuser 118 and mobile device 120 function as a photo meter.

Figure 7B:
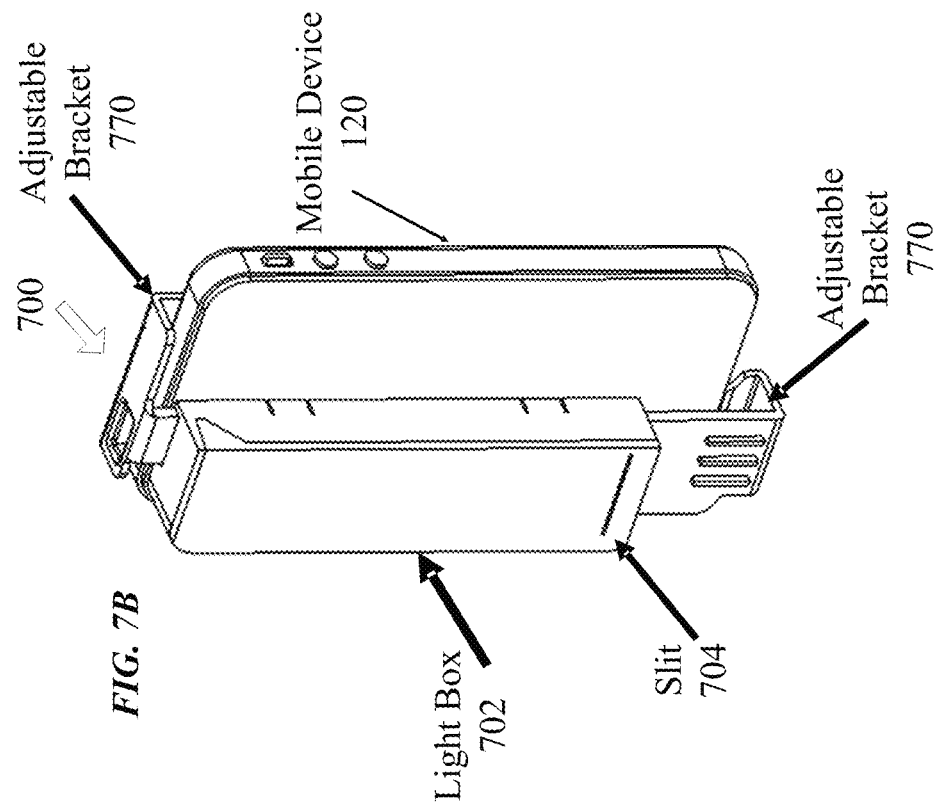
FIG. 7B is a view of an example of the optical accessory of FIG. 7A, from a different perspective and with the attachment bracket in a withdrawn position.
Figure 7A:
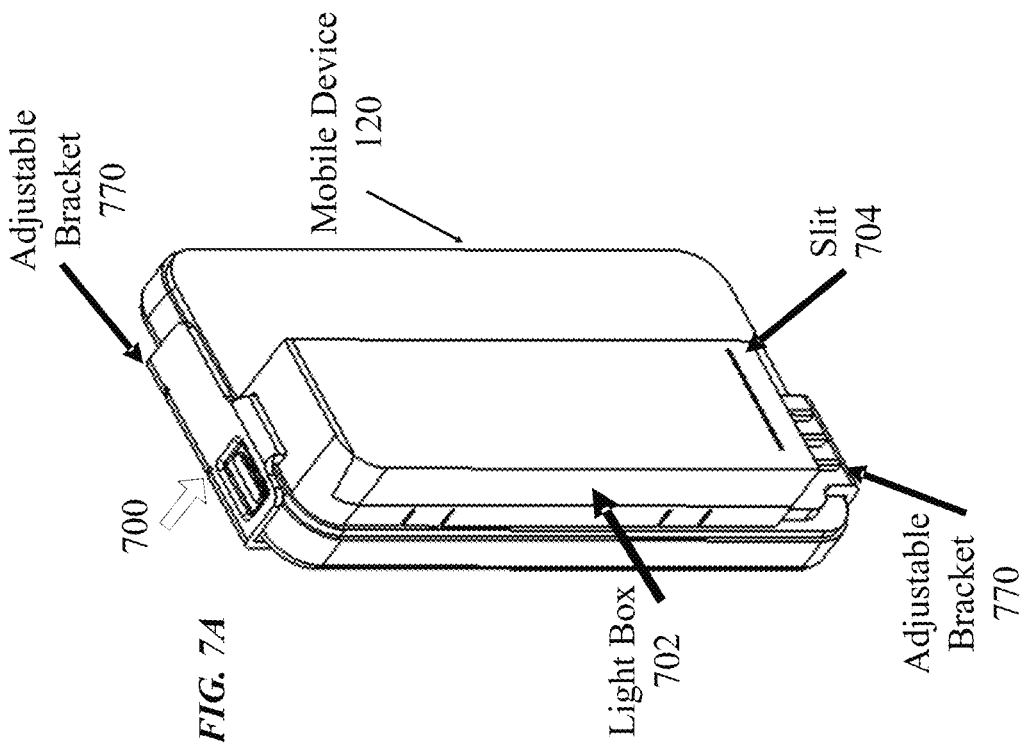
FIG. 7A is an isometric of an example of an optical accessory attached to a mobile device and configured to produce an optical image depicting spectral characteristics of light.

FIG. 7A illustrates mobile device 120 and an optical accessory 700. In this example, light box 702 forms an elongated rectangle that extends along the surface of mobile device 120. This is in contrast to light box 102 of FIG. 1 that extends away from the surface of mobile device 120. In the optical accessory 700, slit 704 is located at the lower end of light box 702 while the upper end of light box 702 is positioned so as to cover camera 122 of mobile device 120. Although not shown in this figure, light box 702 includes an opening, over which diffraction grating 706 is placed, that allows camera 122 of mobile device 120 to capture the produced optical image depicting spectral characteristics of the light entering light box 702 via slit 704.

Although light box 702 is a different shape from light box 102, light box 702 is, for example, constructed of lightweight plastic or other solid opaque material that precludes light from entering the light box generally, similar to light box 102. Although the external color of light box 702 is not significant, the interior, for example, is painted and/or otherwise treated to appear black. In this way, the fully enclosed space is dark and generally void of any light.

FIG. 7A also illustrates an adjustable bracket 770 utilized to attach optical accessory 700 to mobile device 120. Adjustable bracket 770 is, for example, constructed of the same lightweight plastic or other solid material as light box 702. Adjustable bracket 770 is formed by a single extendable length with clips at either end. The clips are, for example, a squared "U" shape and fasten respectively over the top and bottom portions of mobile device 120.

In FIG. 7A, adjustable bracket 770 is shown attaching optical accessory 700 to mobile device 120. FIG. 7B illustrates mobile device 120 and optical accessory 700 from a different perspective. In particular, FIG. 7B depicts adjustable bracket 770 in an extended form such that optical accessory 700 may be removed from mobile device 120.

Figure 7D:
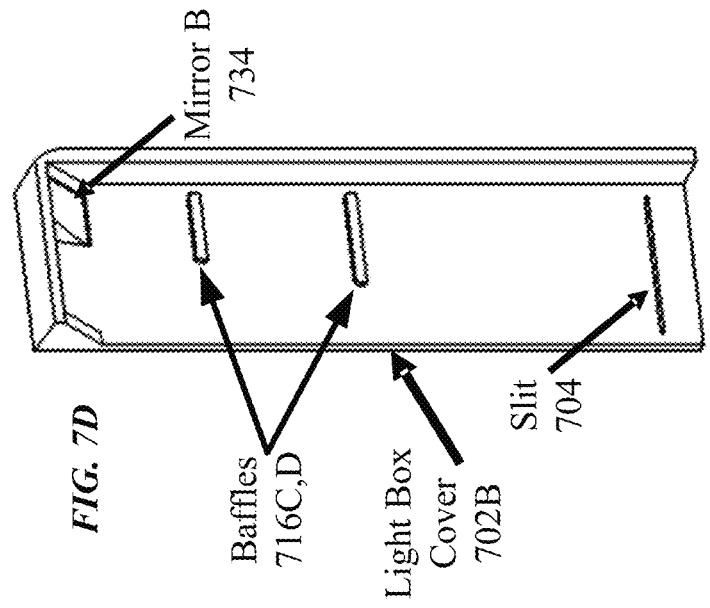
FIG. 7D is a view of an example of a cover of the optical accessory of FIG. 7A with the cover interior exposed.
Figure 7C:
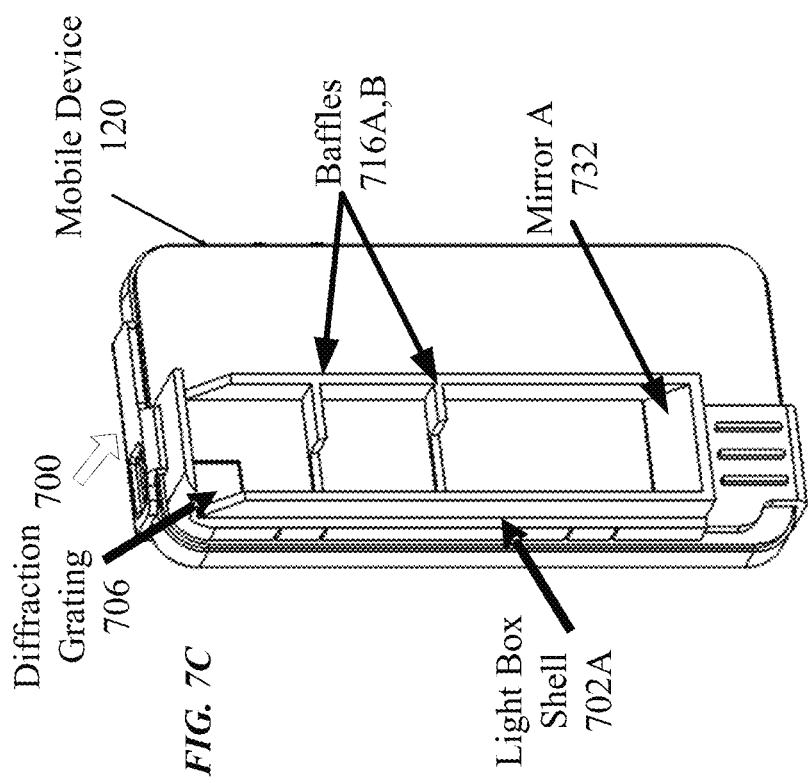
FIG. 7C shows another view of the optical accessory of FIG. 7A with the cover removed and the shell interior exposed.

FIG. 7C illustrates mobile device 120 and the interior of light box 702, as formed by light box shell 702A. FIG. 7D illustrates light box cover 702B which is placed over light box shell 702A of FIG. 7C to form light box 702. The following discussion will refer interchangeably to FIGS. 7C-7D in describing the form of light box 702 and operation of optical accessory 700.

In operation, light enters light box 702 via slit 704 located near the lower end of light box cover 702B. As the light enters via slit 704, the light will strike mirror A 732 located at the lower end of light box shell 702A. Mirror A 732 serves to redirect the light toward the upper end of light box 702. As the light reaches the upper end of light box 702, the light will strike mirror B 734 of light box cover 702B. Mirror B 732 serves to redirect the light toward diffraction grating 706 of light box shell 702A. As the light passes via diffraction grating 706, an optical image depicting spectral characteristics of the light, as described above in relation to FIG. 1, is produced for capture by camera 122 of mobile device 120. Thus, light box 702 functions similar to a periscope for capturing light at the lower end of light box 702 and guiding the light towards the upper end of light box 702.

As the light is guided through light box 702, the light, for example, strikes other surfaces within light box 702. Baffles 716A,B are located in light box shell 702A and baffles 716C,D are located in light box cover 702B in order to deflect and/or otherwise avoid any reflected light from passing via diffraction grating 706. As with baffle 116 of FIG. 5, baffles 716A,B,C,D are made from a lightweight plastic and/or other solid material and are painted and/or otherwise treated to appear black.

Figure 8:
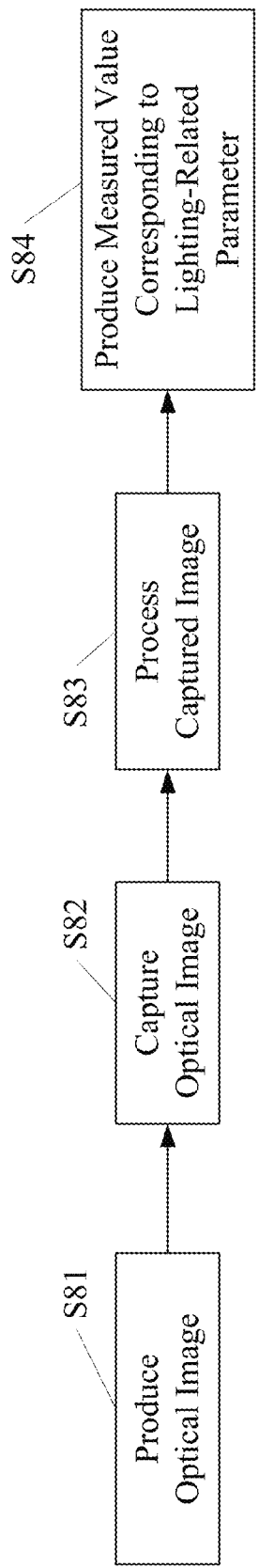
FIG. 8 is a flow chart of an example of a process to capture an optical image depicting spectral characteristics of light and provide at least one lighting-related parameter.

As described above and in greater detail below, a captured optical image depicting spectral characteristics of light entering the optical accessory 100 is processed in order to measure one or more values corresponding to one or more lighting-related parameters. FIG. 8 illustrates an example of a process to generate, capture and process an optical image depicting spectral characteristics of light.

In step S81, an optical image depicting spectral characteristics of light is produced. In one example, optical accessory 100 is used to produce such an optical image. In this example, light enters the light box 102 of optical accessory 100 via slit 104 and passes through diffraction grating 106. As a result, a "rainbow" of colors, with each band representing a corresponding range of wavelengths, is generated as an optical image. This optical image (i.e., "rainbow" of colors), in the example, depicts spectral characteristics of light.

Alternatively, an optical image depicting the visible change in brightness is produced, such as described above in relation to FIG. 6. Such image is produced, for example, via diffuser 118 of FIG. 6.

In step S82, camera 122 of mobile device 120 is utilized to capture the produced optical image. Alternatively, camera 126 of mobile device 120 is utilized to capture the produced optical image. Capturing the produced optical image, for example, results in a digital representation of the produced optical image and thus, a digital representation of the spectral characteristics or visible change in brightness of the light to be analyzed. The captured image (i.e., digital representation of the spectral characteristics of the light), in step S83, is then processed and, in step S84, one or more measured values corresponding to one or more lighting-related parameters is produced.

As discussed above, in one example, the processing in step S83 involves measuring one or more values corresponding to one or more lighting-related parameters. For example, the spectral power distribution of the light is measured and the radiometric, photometric, and/or colorimetric quantities of light are determined. Specifically, characteristics such as illuminance, irradiance, light absorption, scattering of light, reflection of light, fluorescence, phosphorescence, and/or luminescence are determined based on the measured spectral power distribution of the light. Furthermore, based on the measured spectral power distribution, one or more lighting-related parameters are determined. The lighting-related parameters include, for example, correlated color temperature (CCT), delta UV (DUV), chromaticity, color rendering index (CRI) and/or color rendering index-9 (R9). These characteristics and lighting-related parameters provide an identification and quantification of the performance of the light source generating the light entering the optical accessory 100. As a result, a user, such as a lighting professional, can more easily compare and contrast different light sources and provide such comparison to an intended user of a light source.

In this example, multiple photos are taken with multiple exposure settings. For example, camera 122 initially sets aperture, ISO, and shutter speed automatically. With each additional photo, the shutter speed is increased (e.g., approximately 1.25% for each step). In one example, the goal is to achieve a photo with spectral data between 80% and 90% of saturation. This goal is achieved, for example, by different techniques such as taking a dark picture and intelligently increasing the exposure in subsequent photos. The photo with the appropriate maximum spectral data point (e.g., between 80% and 90% of saturation) is selected.

Once a single photo (or multiple photos when using high dynamic range (HDR) techniques) from the multiple photos is selected, the image is processed to determine shape and location of the aperture. The image of the aperture is the zero$^{th}$ order intensity peak for the diffraction pattern. This shape is processed in a well-known, suitable manner and a centerline is determined that runs down the center of the aperture image and parallel to the long edge of the aperture image. One or more secondary axes are determined that run perpendicular to the centerline. The pixel values as a function of distance along this secondary axis are read to give a single, uncorrected, spectral curve with two mirrored spectra. If more than one secondary axes are used, the spectral curves are averaged and/or otherwise combined together in a suitable manner. Distance from the centerline can be transformed to wavelength using data from a wavelength calibration (discussed further below). The intensities are corrected for the wavelength of the light on each pixel, using a spectral intensity calibration (discussed further below). The result is, for example, a single spectral curve with two mirrored spectra.

In order to ensure the processing of step S83 is accurate, calibration is performed. For example, wavelength calibration is conducted with a light source having known spectral lines (e.g., laser, gas discharge lamp, etc.) and intensity calibration is conducted with a light source having a known spectral intensity profile (e.g., tungsten lamp). Wavelength calibration is based, for example, on a linear relationship between pixel distance and wavelength. Known sources (e.g., 405 and 635 nm lasers) act as known anchor points for the data and, using reference wavelengths in a linear interpolation/extrapolation, a wavelength is assigned to each pixel location and distance from the aperture.

Intensity calibration is, for example, a relative calibration and not an absolute calibration. A known black body curve, for example, is used as a reference point. A spectrum of the known black body curve is taken and wavelengths are determined based on the pixel location in the wavelength calibration. The pixel response are calibrated with the known source spectra. In one example, the black body data is divided by the known black body spectra (e.g., calibrated pixel response=black body data/known black body spectra). A calibration may need to be done for any non-linear response of the camera to the intensity of input light (gamma curve). In many cases, these response curves are inherent to the type of sensor and electronics being used and therefore could be set manually by the user and/or automatically by the software directly.

Spectral data calibration is, for example, a relative calibration and not an absolute calibration. A spectrum is collected with a spectrometer and the wavelengths are determined by the pixel location in the wavelength calibration. The sample spectra is then calibrated with the calibrated pixel response (e.g., resultant spectra=sample spectra data/calibrated pixel response).

In an alternate and/or additional example, the visible change in brightness of a light source due to rapid fluctuations in the voltage of the power supply is measured in step S83 and corresponding flicker-related parameters are produced in step S84. In a further example, the amount and intensity of brightness is measured and produced in steps S83 and S84.

Figure 9:
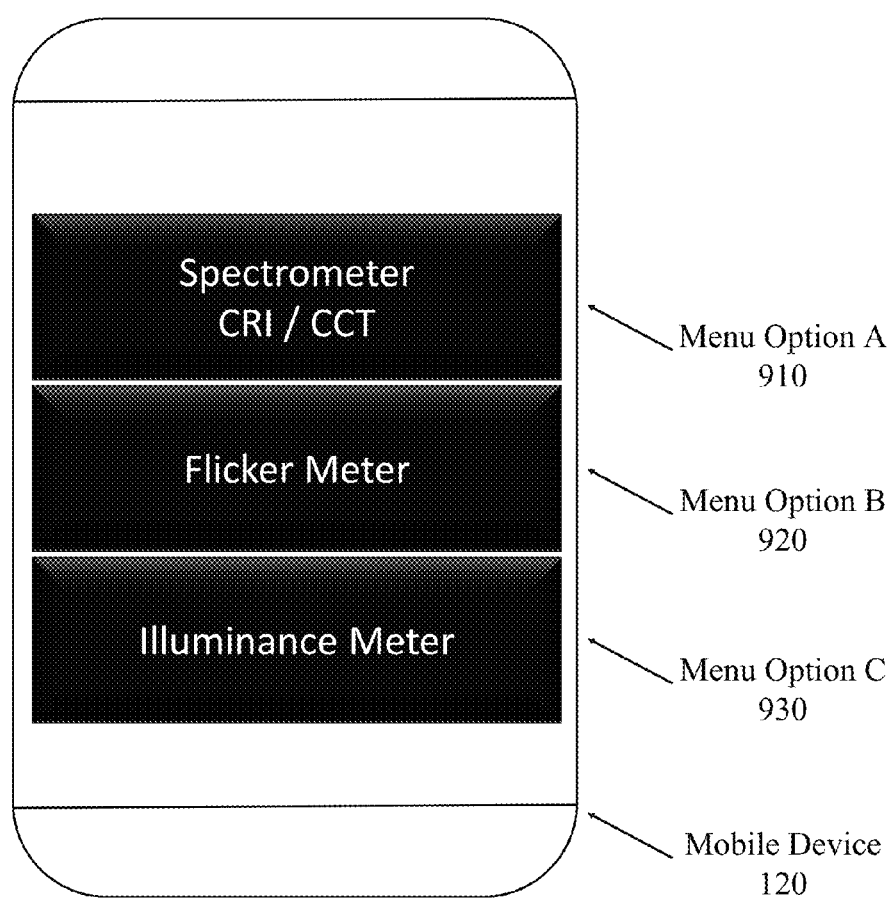
FIG. 9 illustrates an example of a user interface menu of a lighting meter application for operating a mobile device.

FIG. 9 depicts an example of a screen of a user interface of mobile device 120 used to manipulate the operation of mobile device 120 in conjunction with any one of the optical accessories in FIGS. 1-7A. The user interface screen includes menu option A 910, menu option B 920 and menu option C 930. Menu option A 910 is labeled Spectrometer CRI/CCT and, when selected, enables operation of the mobile device 120 and optical accessory as a spectrometer and/or paint meter. Menu option B 920 is labeled Flicker Meter and, when selected, enables operation of the mobile device 120 and optical accessory as a flicker meter. Menu option C 930 is labeled Illuminance Meter and, when selected, enables operation of the mobile device 120 and optical accessory as an illuminer meter. The corresponding operations will next be described in relation to examples of further user interface screens shown in FIGS. 10-14.

Figure 10:
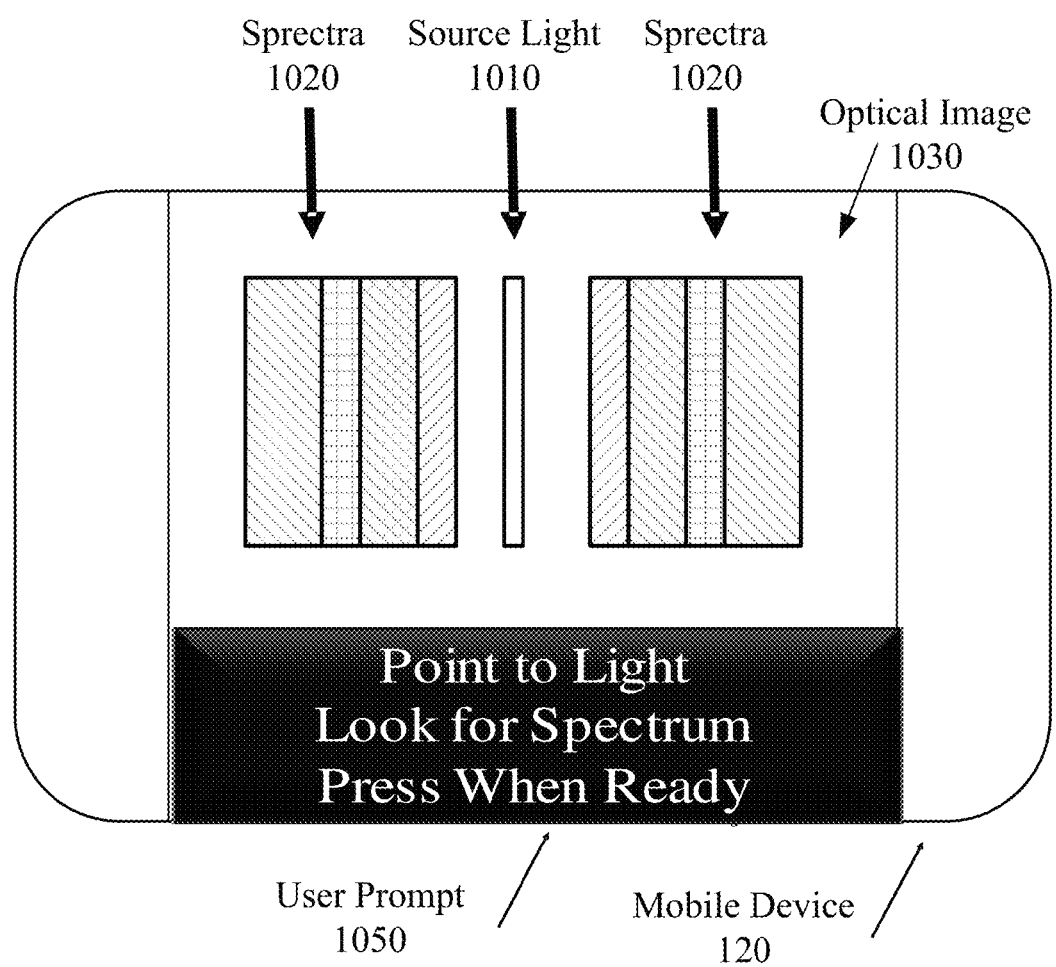
FIG. 10 illustrates an example of another user interface screen while operating a mobile device via the meter application.

FIG. 10 depicts a screen of the user interface of mobile device 120 after menu option A 910 is selected. The user interface screen includes a display of the source light 1010 and color spectra 1020 as part of optical image 1030 produced by an optical accessory, such as any of the optical accessories of FIGS. 1-7A. The user interface screen also includes user prompt 1050 providing user guidance for operation of the mobile device and optical accessory. Specifically, user prompt 1050 instructs the user to point the mobile device and optical accessory at the light source to be analyzed. The user is further instructed to verify the produced optical image and press user prompt 1050 when ready to capture the produced optical image. This user action results in the produced optical image being captured by the camera of the mobile device and digitized into a form that can be processed.

Figure 11:
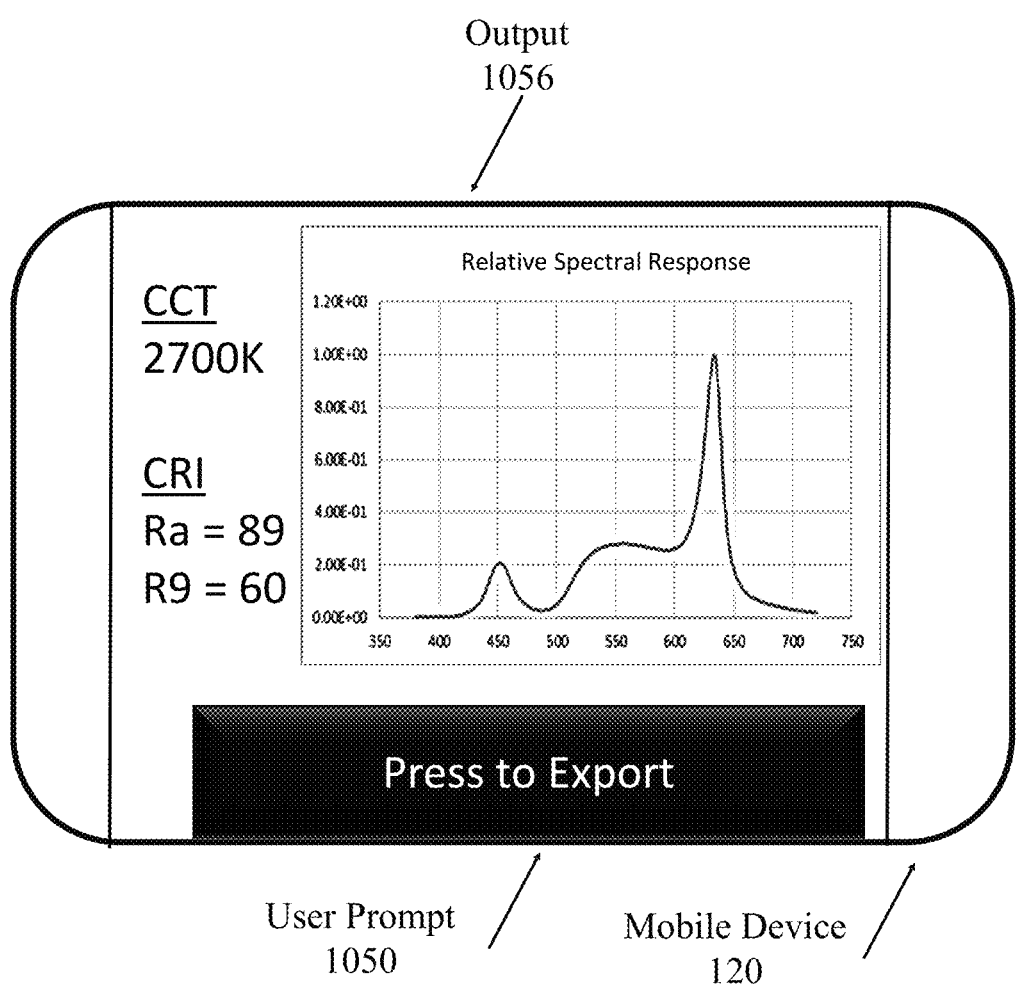
FIG. 11 illustrates an example of a user interface screen of the meter application presenting results from operating a mobile device via the meter application.

FIG. 11 depicts a screen of the user interface of mobile device 120 including the results of such processing after the produced optical image is captured and digitized. Output 1056 reflects a graph depicting the intensity of the various wavelengths contained within the light as well as lighting-related parameters corresponding to the light. User prompt 1050 is also updated to reflect that the output may be exported by selecting the user prompt 1050.

Figure 12:
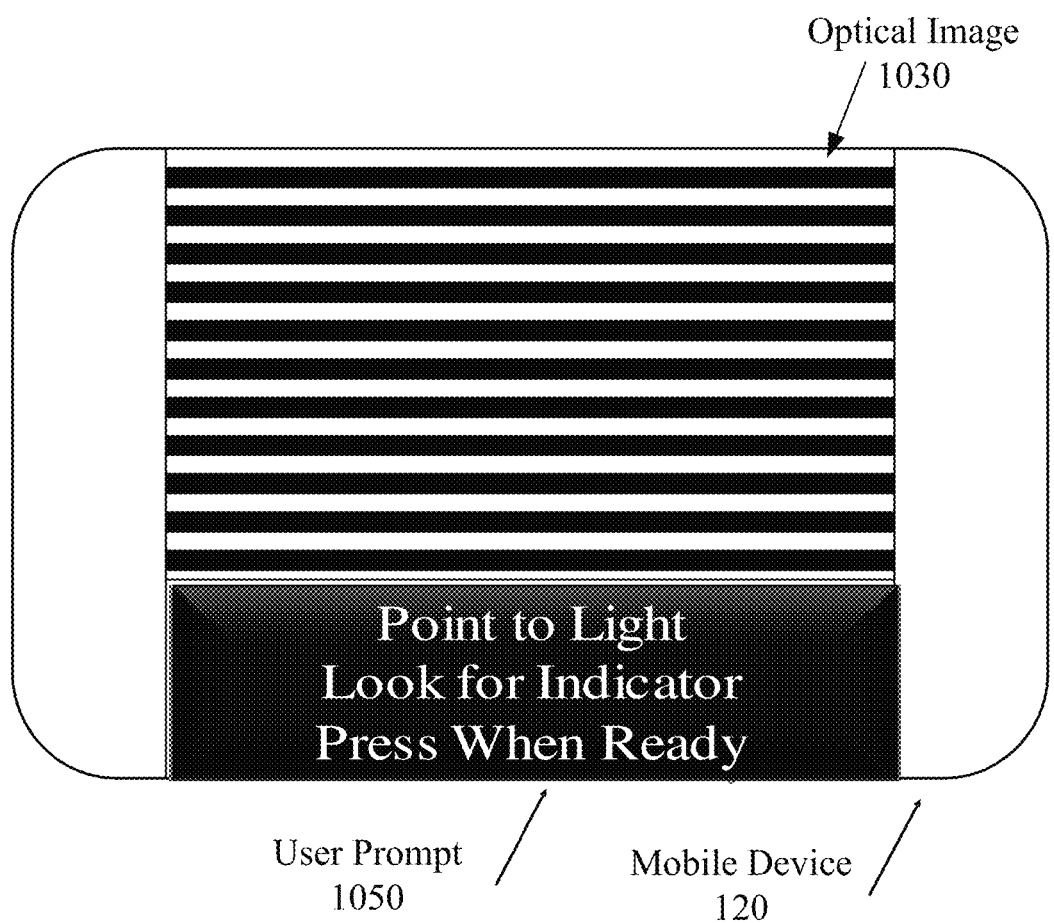
FIG. 12 illustrates an example of an additional user interface screen while operating a mobile device via the meter application.

FIG. 12 depicts a screen of the user interface of mobile device 120 after menu option B 920 is selected. The user interface screen includes a display of optical image 1030 produced, for example, by diffuser 118 covering camera 126 as illustrated in FIG. 6. That is, optical image 1030 depicts bands of light and dark caused by the flickering light captured over a short period of time. As with FIG. 10, user prompt 1050 provides user guidance for operation of the mobile device and optical accessory for use as a flicker meter.

Figure 13:
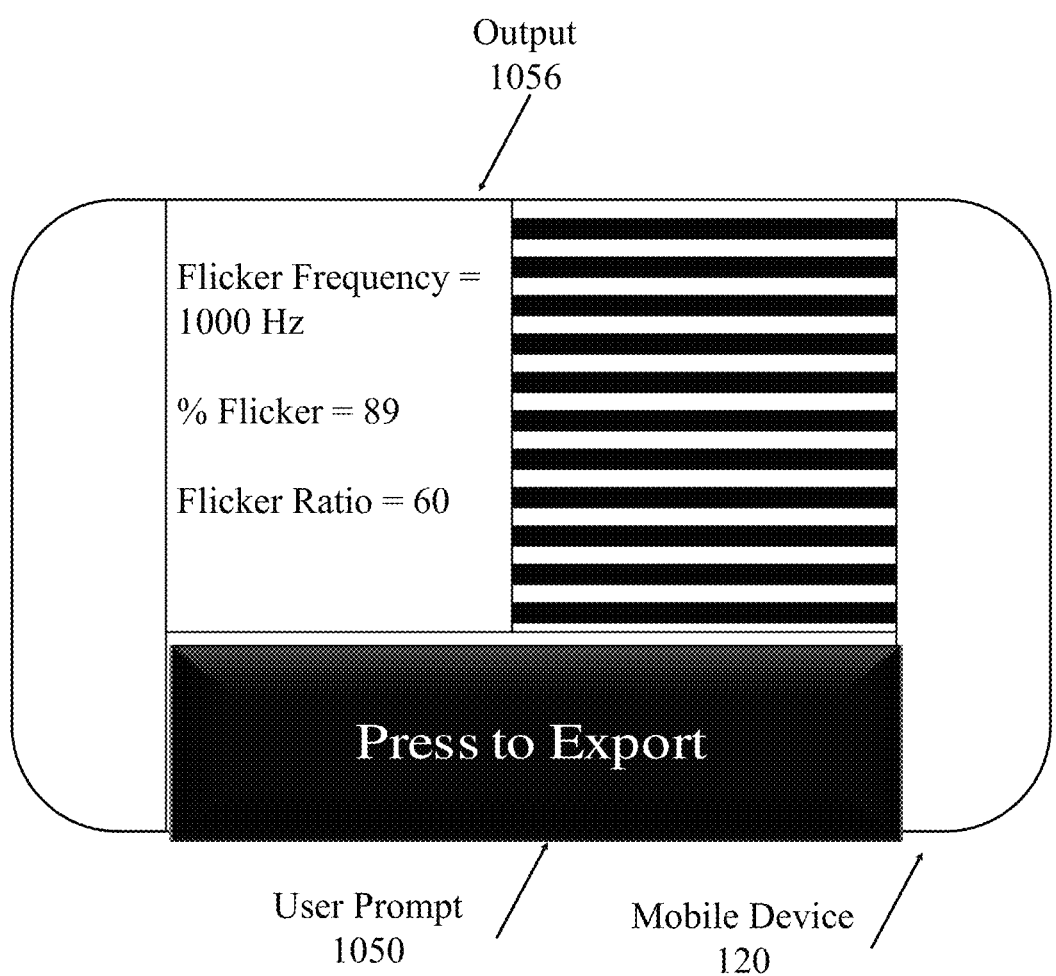
FIG. 13 illustrates an example of an additional user interface screen of the meter application presenting results from operating a mobile device via the meter application.

FIG. 13 depicts a screen of the user interface of mobile device 120 including the results of such operation as a flicker meter. Output 1056 reflects the captured image as well as flicker-related parameters. As with FIG. 11, user prompt 1050 is updated to reflect that the output may be exported by selecting the user prompt 1050.

Figure 14:
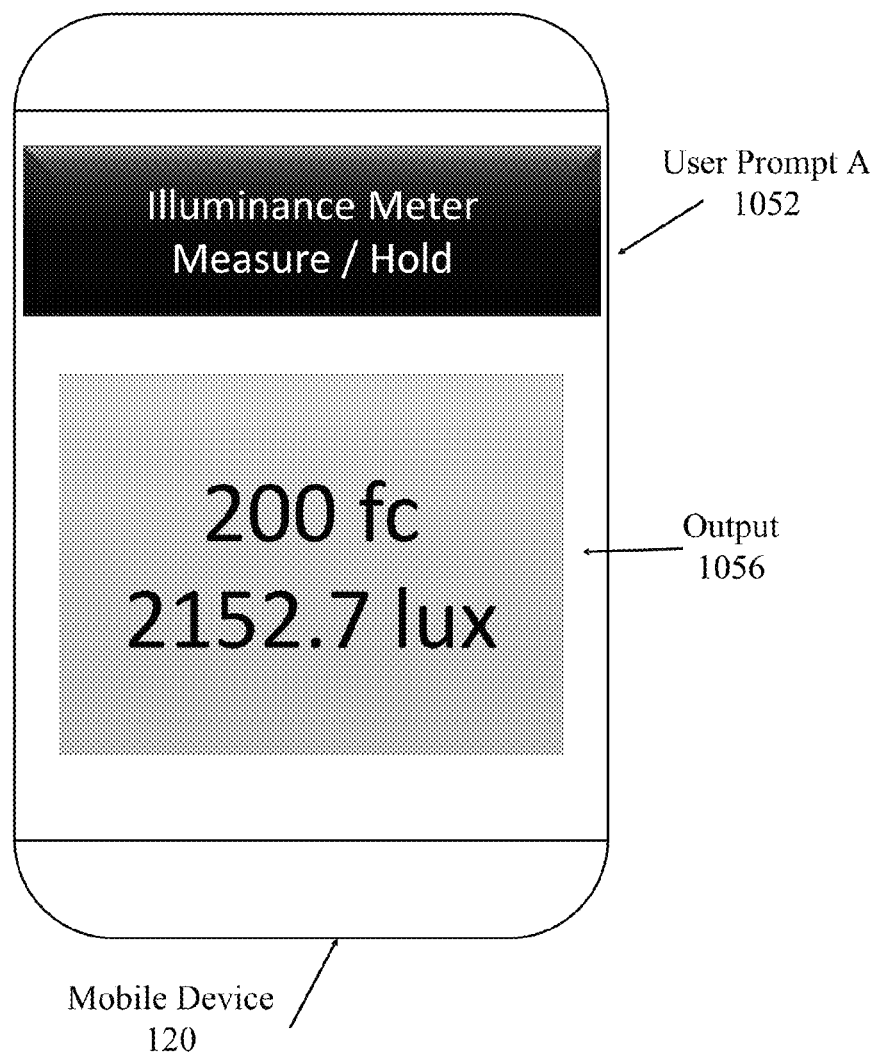
FIG. 14 illustrates an example of a further user interface screen while operating a mobile device via the meter application, and presenting results from such operation.

FIG. 14 depicts a screen of the user interface of mobile device 120 after menu option C 930 is selected. Unlike the user interface screens of FIGS. 10 and 12, the user interface screen of FIG. 14 includes user prompt A 1052 and user prompt B 1054 as well as output 1056. That is, while the user interface screens of FIGS. 10 and 12 allow a user to identify a particular optical image 1030 for capture with results displayed as output 1056 of the user interface screens of FIGS. 11 and 13, the user interface screen of FIG. 14 displays the output 1056 directly after user prompt A 1052 is pressed. More particularly, user prompt A 1052 provides user guidance for operation of the mobile device and optical accessory for use as an illuminance meter. When user prompt A 1052 is pressed, camera 126, for example, captures the light passing through diffuser 118 of FIG. 6 and mobile device 120 calculates the irradiance value and the illuminance value of such light. The resulting value is displayed as part of output 1056. At the same time, user prompt B 1054 allows the user to alternate between displaying the measured value as lux and/or foot-candles.

Figure 15:
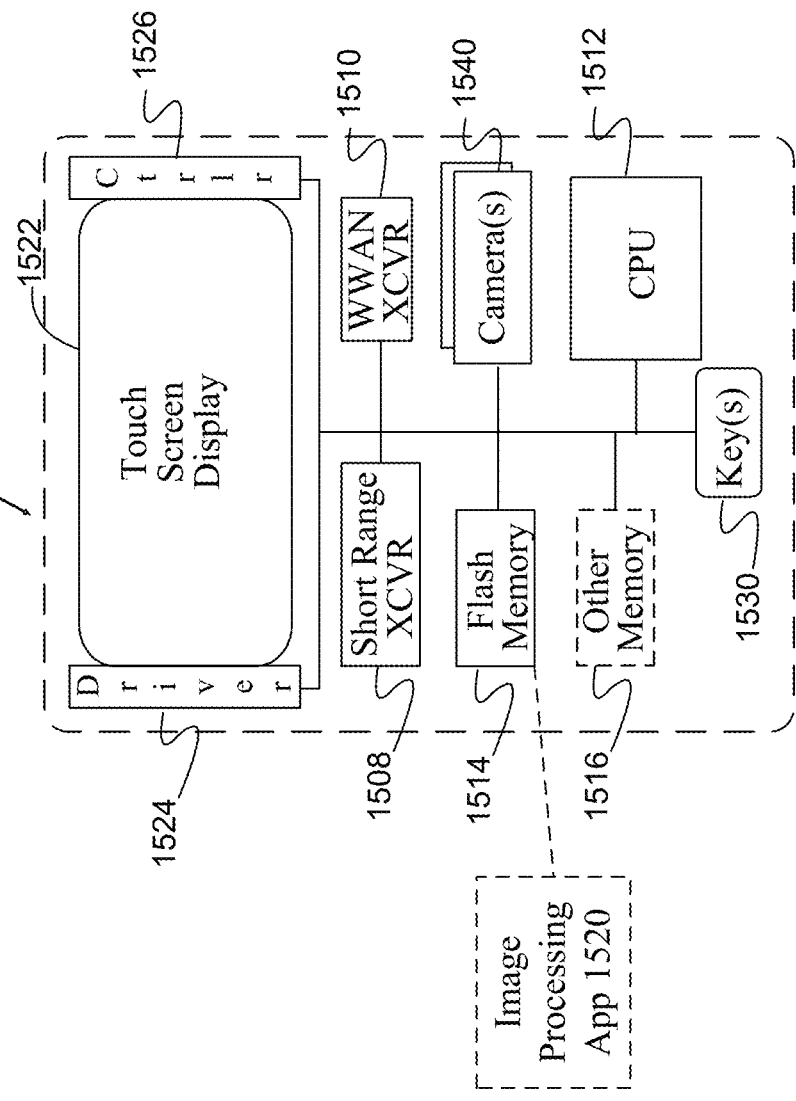
FIG. 15 is a simplified functional block diagram of a mobile device for use with the optical accessory of FIGS. 1-7A.

FIG. 15 provides a block diagram illustration of an example of a touch screen type mobile device 120, such as a smartphone or a table. The mobile device 120 in the example includes at least one short range transceiver (XCVR) 1508 and at least one long range transceiver (WWAN XCVR) 1510, for digital wireless communications, although the handset 120 may include additional digital or analog transceiver(s). The concepts discussed here encompass embodiments of the mobile device 120 utilizing any digital transceivers that conform to current or future developed digital wireless communication standards; although in other cases, only one or no transceivers may be provided.

Mobile device 120 includes a microprocessor (CPU) 1512 which serves as a programmable controller for the mobile device 120, in that it controls all operations of the mobile device 120 in accord with programming that it executes, for all normal operations, and for operations involved in processing an optical image under consideration here. In the example, the mobile device 120 includes flash type program memory 1514, for storage of various program routines and mobile configuration settings, such as image processing app 1520 for processing a captured optical image produced by optical accessory 100. The mobile device 120 may also include other memory 1516 for a working data processing memory. Of course, other storage devices or configurations may be added to or substituted for those in the example. The flash type program memory 1514 stores firmware such as a boot routine, device driver software, an operating system, call processing software, vocoder control software, and any of a wide variety of other applications, such as image processing app 1520.

Hence, as outlined above, the mobile device 120 includes a processor, and programming stored in the flash memory 1514 configures the processor so that the mobile device is capable of performing various desired functions, including in this case the functions involved in the technique for processing an optical image depicting spectral characteristics of light.

Mobile device 120 may have a limited number of key(s) 1530 and the user interface functions are implemented by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the mobile device 120 in our example includes a display 1522, which the microprocessor 1512 controls via a display driver 1524, to present visible outputs to the device user. The mobile device 15 also includes a touch/position controller 1526. The controller 1526 is relatively transparent, so that the user may view the information presented on the display 1522. The controller 1526 senses signals from elements of the touch/position controller 1526 and detects occurrence and position of each touch of the screen formed by the display 1522 and controller 1526. The controller 1528 provides touch position information to the microprocessor 1512, which can correlate that information to the information currently displayed via the display 1522, to determine the nature of user input via the screen.

The display 1522 and touch sensor 1526 (and possibly one or more keys 1530, if included) are the physical elements providing the textual and graphical user interface for the mobile device 120. Mobile device 120, in our example, also includes one or more cameras 1540, each for capturing images, such as an optical image depicting spectral characteristics of light produced by optical accessory 100.

The block diagram of a hardware platform of FIG. 15 represents an example of a mobile device, such as a tablet computer, smartphone or the like with a network interface to a wireless link, which may alternatively serve as a user terminal or interface device, such as the lighting meter and/or spectrometer under consideration here.

As also outlined above, aspects of the user interface and any associated techniques for processing an optical image produced by optical accessory 100 may be embodied in programming of the appropriate system elements, particularly for the processor of mobile device 120. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming and/or associated data may at times be communicated through the Internet or various other telecommunication networks. Such communications, for example, may enable loading of the programming and/or data from one computer or processor into another, for example, from a management server or host computer into the mobile device 120, including programming for capturing and processing an optical image depicting spectral characteristics of light produced by optical accessory 100. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A mobile system, comprising:
   an optical accessory configured to produce an optical image depicting spectral characteristics of a direct light sample of light generated, for general illumination of an occupied space, by a lighting device within the occupied space and directly entering the optical accessory as generated by the lighting device; and
   a program, wherein execution of the program by a processor of a mobile device configures the system to implement functions, including functions to:
      control an image capture sensor of the mobile device to capture the optical image produced by the optical accessory;
      process the captured optical image to measure the spectral power distribution of the direct light sample and produce a plurality of measured values related to the spectral characteristics of the direct light sample;
      determine, based on the measured spectral power distribution and the plurality of measured values, a plurality of lighting-related performance parameters of the lighting device, the plurality of lighting-related performance parameters indicating performance of the lighting device within the occupied space; and
      output, via the mobile device, the plurality of lighting-related performance parameters as an indication of performance of the lighting device within the occupied space.

2. The system of claim 1, wherein the optical accessory comprises:
   an elongated light box configured for attachment to the mobile device to position the elongated light box proximate to the image capture sensor of the mobile device;

a diffraction grating located near the proximal end of the elongated light box; and a slit located in or near the distal end of the elongated light box.

3. The system of claim 2, wherein at least one of the plurality of lighting-related performance parameters of the lighting device includes one or more of:
   correlated color temperature;
   delta UV (Duv);
   chromaticity;
   color rendering index;
   Ra;
   color quality scale; or
   gamut area index.

4. The system of claim 2, wherein the plurality of measured values includes one or more of:
   a photometric quantity;
   a colorimetric quantity; or
   a radiometric quantity.

5. The system of claim 2, wherein the optical accessory further comprises a diffuser located within the light box and covering the slit.

6. The system of claim 2, wherein the optical accessory further comprises a second elongated light box configured for attachment to the mobile device to position the second elongated light box proximate a camera flash of the mobile device, wherein the at least one measured value is a reflectance quantity related to a surface to be analyzed.

7. The system of claim 1, wherein the optical accessory comprises a diffuser configured for attachment to the mobile device to position the diffuser proximate the image capture sensor of the mobile device.

8. The system of claim 7, wherein at least one of the plurality of measured values is the rate of cycles of intensity of the light entering the optical accessory between local maxima and minima.

9. The system of claim 1, wherein the image capture sensor is integral to a housing of the mobile device.

10. The system of claim 1, wherein the mobile device comprises:
    a digital camera including the image capture sensor; and
    one device configured to communicate with the digital camera, the one device selected from the group of:
    a smartphone;
    a tablet computer; and
    a personal computer.

11. A non-transitory machine-readable storage medium having executable instructions stored therein executable by a processor of a mobile device, wherein execution of the instructions by the processor configures the mobile device to perform functions, including functions to:
    control an image capture sensor of the mobile device to capture an optical image produced by an optical accessory, the optical image depicting spectral characteristics of a direct light sample of light generated, for general illumination of an occupied space, by a lighting device within the occupied space and directly entering the optical accessory as generated by the lighting device;
    process the captured optical image to measure the spectral power distribution of the direct light sample and produce a plurality of measured values related to the spectral characteristics of the direct light sample;
    determine, based on the measured spectral power distribution and the plurality of measured values, a plurality of lighting-related performance parameters of the lighting device, the plurality of lighting-related performance parameters indicating performance of the lighting device within the occupied space; and
    output, via the mobile device, the plurality of lighting-related performance parameters as an indication of performance of the lighting device within the occupied space.

12. The storage medium of claim 11, wherein at least one of the plurality of lighting-related performance parameters of the lighting device includes one or more of:
    correlated color temperature;
    delta UV (Duv);
    chromaticity;
    color rendering index;
    Ra;
    color quality scale; or
    gamut area index.

13. The storage medium of claim 11, wherein the plurality of measured values includes one or more of:
    a radiometric quantity;
    a reflectance quantity;
    a colorimetric quantity;
    the rate and depth of cycles of intensity of light between local maxima and minima; or
    a photometric quantity.

14. A method, comprising the steps of:
    producing, by an optical accessory proximate an image capture sensor of a mobile device, an optical image depicting spectral characteristics of a direct light sample of light generated, for general illumination of an occupied space, by a lighting device within the occupied space and directly entering the optical accessory as generated by the lighting device;
    capturing, by the image capture sensor, the produced optical image;
    processing, by the mobile device, the captured optical image to measure the spectral power distribution of the direct light sample and produce a plurality of measured values related to the spectral characteristics of the direct light sample;
    determining, based on the measured spectral power distribution and the plurality of measured values, a plurality of lighting-related performance parameters of the lighting device, the plurality of lighting-related performance parameters indicating performance of the lighting device within the occupied space; and
    outputting, via the mobile device, the plurality of lighting-related performance parameters as an indication of performance of the lighting device within the occupied space.

15. The method of claim 14, wherein at least one of the plurality of lighting-related performance parameters of the lighting device includes one or more of:
    correlated color temperature;
    delta UV (Duv);
    chromaticity;
    color rendering index;
    Ra;
    color quality scale; or
    gamut area index.

16. The method of claim 14, wherein the plurality of measured values includes one or more of:
    a radiometric quantity;
    a reflectance quantity;

a colorimetric quantity
the rate and depth of cycles of intensity of light between
   local maxima and minima; or
a photometric quantity.

* * * * *